US010097837B2

United States Patent
Pu et al.

(10) Patent No.: US 10,097,837 B2
(45) Date of Patent: Oct. 9, 2018

(54) PALETTE RUN HIDING IN PALETTE-BASED VIDEO CODING

(71) Applicant: QUALCOMM Incorporated, San Diego, CA (US)

(72) Inventors: Wei Pu, San Diego, CA (US); Feng Zou, San Diego, CA (US); Rajan Laxman Joshi, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 14/878,697

(22) Filed: Oct. 8, 2015

(65) Prior Publication Data

US 2016/0105676 A1 Apr. 14, 2016

Related U.S. Application Data

(60) Provisional application No. 62/165,064, filed on May 21, 2015, provisional application No. 62/062,627, filed on Oct. 10, 2014.

(51) Int. Cl.
*H04N 19/176* (2014.01)
*H04N 19/13* (2014.01)
(Continued)

(52) U.S. Cl.
CPC ........... *H04N 19/176* (2014.11); *H04N 19/13* (2014.11); *H04N 19/186* (2014.11); *H04N 19/44* (2014.11);
(Continued)

(58) Field of Classification Search
CPC .... H04N 19/13; H04N 19/176; H04N 19/186; H04N 19/44; H04N 19/46; H04N 19/48;
(Continued)

(56) References Cited

U.S. PATENT DOCUMENTS

| 7,016,547 | B1 * | 3/2006 | Smirnov | ................. | H03M 7/40 |
| | | | | | 375/E7.144 |
| 2002/0159632 | A1 * | 10/2002 | Chui | ........................ | G06T 9/00 |
| | | | | | 382/168 |

(Continued)

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

(Continued)

*Primary Examiner* — Md N Haque
(74) *Attorney, Agent, or Firm* — Shumaker & Sieffert, P.A.

(57) ABSTRACT

A video decoder may obtain a syntax element from a bitstream comprising an encoded representation of a block of video data. The block comprises a series of runs, each of which may consist of one pixel or two or more consecutive pixels. Furthermore, the video decoder may obtain a set of palette run length syntax elements indicating lengths of one or more of the runs. The video decoder may determine, based on the syntax element, that the palette run length syntax elements do not include a palette run length syntax element indicating a length of the first run. Rather, the video decoder determines, based on the lengths indicated by the set of palette run syntax elements, the length of the first run. The video decoder may determine, based on the palette sample modes of the pixels, palette indices of the pixels, each indicating an entry in a palette.

29 Claims, 6 Drawing Sheets

(51) Int. Cl.

| | |
|---|---|
| *H04N 19/44* | (2014.01) |
| *H04N 19/90* | (2014.01) |
| *H04N 19/93* | (2014.01) |
| *H04N 19/50* | (2014.01) |
| *H04N 19/503* | (2014.01) |
| *H04N 19/70* | (2014.01) |
| *H04N 19/46* | (2014.01) |
| *H04N 19/593* | (2014.01) |
| *H04N 19/186* | (2014.01) |
| *H04N 19/48* | (2014.01) |

(52) U.S. Cl.
CPC ............. *H04N 19/46* (2014.11); *H04N 19/48* (2014.11); *H04N 19/50* (2014.11); *H04N 19/503* (2014.11); *H04N 19/593* (2014.11); *H04N 19/70* (2014.11); *H04N 19/90* (2014.11); *H04N 19/93* (2014.11)

(58) Field of Classification Search
CPC .... H04N 19/50; H04N 19/503; H04N 19/593; H04N 19/70; H04N 19/90; H04N 19/93
See application file for complete search history.

(56) References Cited

U.S. PATENT DOCUMENTS

| | | | | |
|---|---|---|---|---|
| 2003/0048943 | A1* | 3/2003 | Ishikawa ................. | G06T 9/005 382/166 |
| 2008/0273804 | A1* | 11/2008 | Malewski .............. | H04N 1/644 382/233 |
| 2015/0281728 | A1 | 3/2015 | Karczewicz et al. | |

OTHER PUBLICATIONS

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T 5G.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/5C29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T Sg.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
International Search Report and Written Opinion—PCT/US2015/054956—ISA/EPO—dated Jan. 4, 2016—17 pp.
Response to International Search Report dated Jan. 4, 2016 from international application No. PCT/US2015/054956 filed Aug. 9, 2016, 7 pp.
Second Written Opinion dated Oct. 18, 2016 issued by ISA/EPO from international application No. PCT/US2015/054956 9 pp.
Chen et al., "Description of Screen Content Coding Technology Proposal by Qualcomm", Joint Collaborative Team on Video Coding of ISO/IEC JTC1/SC29/WG11 and ITU-T SG.16, 17th JCT-VC Meeting, No. JCTVC-Q0031-v3, Mar. 28, 2014, XP030115916, 19 pp.
Pu et al., "Non-CE6: Improvement on Palette Run Coding," Joint Collaborative Team on Video Coding of ISO/IEC JTC1/SC29/WG11 and ITU-TSG.16, 19th JCT-VC Meeting, No. JCTVC-S0111r3, Oct. 18, 2014, XP030116865, 4 pp.
Pu et al., "CE1 Test B.1: Modified Palette Run Coding," Joint Collaborative Team on Video Coding of ISO/IEC JTC1/SC29/WG11 and ITU-TSG.16, 20th JCT-VC Meeting; No. JCTVC-T0034, Jan. 31, 2015, XP030117142, 2 pp.
Xiu et al., "Non-CE1: Improved Palette Run-length Coding with Palette Flipping," Joint Collaborative Team on Video Coding of ISO/IEC JTC1/SC29/WG11 and ITU-TSG.16, 20th JCT-VC Meeting, No. JCTVC-T0119, Jan. 31, 2015, XP030117266, 8 pp.
Zou et al., "Non-RCE4: Joint proposal of JCTVC-P0231 and JCTVC-P0119: Palette with limit run and lasted coded palette prediction", Joint Collaborative Team on Video Coding of ISO/IEC JTC1/SC29/WG11 and ITU-T SG.16, 16th JCT-VC Meeting, No. JCTVC-P0239, Jan. 10, 2014, XP030115784, 4 pp.
Lin et al., "Non-CE6: Escape colour signalling," Joint Collaborative Team on Video Coding of ITU-TSG.16 WP3 ISO/IEC JTC 1/SC 29/WG 11, 19th JCTVC Meeting, document No. JCTVC-S0055_r1, Oct. 14, 2014, 3 pp.
Bross et al., "High Efficiency Video Coding (HEVC) Text Specification Draft 10 (for FDIS & Consent)," JCVC-L1003_v13, 12th Meeting of JCT-VC of ITU-T SG16 WP 3 and ISO/IEC JCT 1/SC 29/WG 11, Jan. 14-23, 2013.
Joshi et al., "High Efficiency Video Coding (HEVC) Screen Content Coding: Draft 2," Joint Collaborative Team on Video Coding of ITU-TSG.16 WP3 ISO/IEC JTC 1/SC 29/WG 11, 18th JCTVC Meeting, No. JCTVC-51005, Jun. 30-Jul. 9, 2014, 374 pp.
Yu et al., "Common test conditions for screen content coding," Joint Collaborative Team on Video Coding (JCT-VC) of ITU-T SG 16 WP 3 and ISO/IEC JTC 29/WG 11, 20th Meeting No. JCTVC-T1015, Feb. 10-17, 2015, 8 pp.
Huang et al., "Description of Screen Content Core Experiment 3 (SCCE3): Palette mode," Joint Collaborative Team on Video Coding (JCT-VC) of ITU-T SG 16 WP 3 and ISO/IEC JTC 1/SC 29/WG 11, 17th Meeting, No. JCTVC-Q1123, Mar. 27-Apr. 4, 2014, 11 pp.
Joshi et al., "High Efficiency Video Coding (HEVC) Screen Content Coding: Draft 3," Joint Collaborative Team on Video Coding (JCT-VC) of ITU-T SG 16 WP 3 and ISO/IEC JTC 1/SC 29/WG 11, 20th meeting, No. JCTVC-T1005, Feb. 10-17, 2015, 567 pp.

(56) References Cited

OTHER PUBLICATIONS

Pu et al., "AHG10: Suggested Software for Palette Coding based on RExt6.0," Joint Collaborative Team on Video coding (JCT-VC) of ITU-T SG16 WP3 and ISO/IEC JTC1/SC29/WG11, 17th Meeting, No. JCTVC-Q0094, Mar. 27-Apr. 4, 2014, 4 pp.

Karczewicz et al., "Non-CE1: Palette Run Hiding," Collaborative Team on Video Coding (JCT-VC) of ITU-T SG 16 WP 3 and ISO/IEC JTC 1/SC 29/WG 11, 21st Meeting, No. JCTVC-U0094r1, Jun. 19-26, 2015, 3 pp.

International Preliminary Report on Patentability for corresponding PCT Application No. PCT/US2015/054956 dated Jan. 20, 2017, 13 pp.

\* cited by examiner

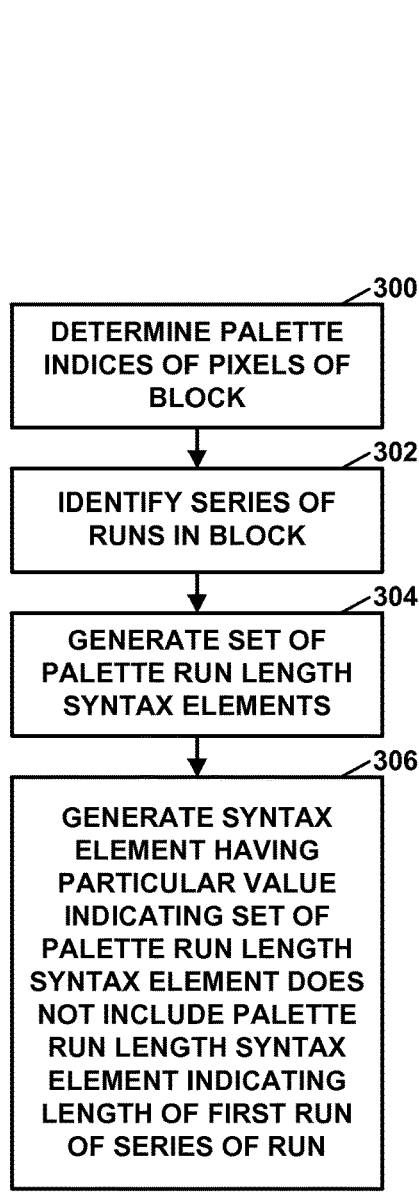
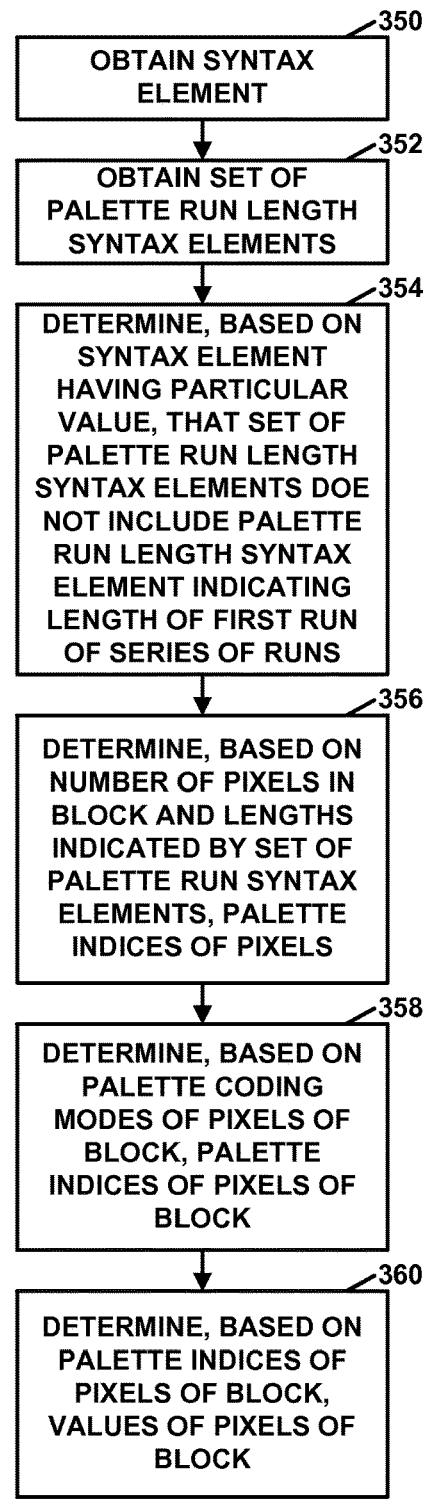
FIG. 6A
FIG. 6B

PALETTE RUN HIDING IN PALETTE-BASED VIDEO CODING

This application claims the benefit of U.S. Provisional Patent Application 62/062,627, filed Oct. 10, 2014, and U.S. Provisional Patent Application 62/165,064, filed May 21, 2015, the entire content of each of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized.

SUMMARY

In general, this application describes a technique for encoding and decoding video data using palette mode. As described herein, a palette comprises a plurality of entries. Each of the entries may specify one or more sample values. Each pixel of a palette-coded block is associated with a palette index indicating an entry in a palette. Consecutive pixels frequently have the same palette indices as pixels left or above the pixels. Hence, rather than signaling palette indices of each pixel, a video encoder may signal a length of a "run" of a pixel. Each respective pixel of a run of pixels may be copied from above the respective pixel or copied from a pixel left of the respective pixel. In accordance with a technique of this disclosure, a video encoder may omit signaling a length of a first or last run of a block.

In one example, this disclose describes a method of decoding video data, the method comprising: obtaining a syntax element from a bitstream that comprises an encoded representation of a block of the video data, wherein the block comprises a series of runs, the series of runs including two or more runs, each respective run of the series of runs consisting of one pixel or two or more consecutive pixels of the block, each pixel of each respective run of the series of runs having the same palette sample mode; obtaining, from the bitstream, a set of one or more palette run length syntax elements, wherein the one or more palette run length syntax elements indicate lengths of one or more runs in the series of runs; determining, based on the syntax element having a particular value, that the set of palette run length syntax elements does not indicate a length of the first run of the series of runs; determining, based on the number of pixels in the block and the lengths indicated by the set of palette run syntax elements, the length of the first run of the series of runs; determining, based on the palette sample modes of the pixels of the block, palette indices of non-escape coded pixels of the block, wherein, for each respective non-escape coded pixel of the block, the respective palette index of the respective non-escape coded pixel indicates an entry in a palette, each respective entry in the palette indicating a respective set of sample values; and determining, based on the palette indices of the non-escape coded pixels of the block, values of the non-escape coded pixels of the block.

In another example, this disclosure describes a method of encoding video data, the method comprising: determining palette indices of non-escape coded pixels of a block of the video data, wherein, for each respective non-escape coded pixel of the block, the palette index of the respective non-escape coded pixel indicates an entry in a palette, wherein each respective entry in the palette indicates a respective set of sample values; identifying a series of runs in the block, the series of runs including two or more runs, each respective run of the series of runs consisting of one pixel or two or more consecutive pixels of the block, each pixel of each respective run of the series of runs having the same palette sample mode; generating a set of one or more palette run length syntax elements, wherein the one or more palette run length syntax elements indicate lengths of one or more runs in the series of runs; and generating a syntax element having a particular value indicating the set of palette run length syntax elements does not indicate a length of the first run of the series of runs.

In another example, this disclosure describes a device for decoding video data, the device comprising: a memory configured to store the video data; and one or more processors configured to: obtain a syntax element from a bitstream that comprises an encoded representation of a block of the video data, wherein the block comprises a series of runs, the series of runs including two or more runs, each respective run of the series of runs consisting of one pixel or two or more consecutive pixels of the block, each pixel of each respective run of the series of runs having the same palette sample mode; obtain, from the bitstream, a set of one or more palette run length syntax elements, wherein the one or more palette run length syntax elements indicate lengths of one or more runs in the series of runs; determine, based on the syntax element having a particular value, that the set of palette run length syntax elements does not indicate a length of the first run of the series of runs; determine, based on the number of pixels in the block and the lengths indicated by the set of palette run syntax elements, the length of the first run of the series of runs; determine, based on the palette sample modes of non-escape coded pixels of the block, palette indices of the non-escape coded pixels of the block, wherein, for each respective non-escape coded pixel of the block, the respective palette index of the respective non-escape coded pixel indicates an entry in a palette, each respective entry in the palette indicating a respective set of sample values; and determine, based on the palette indices of the non-escape coded pixels of the block, values of the non-escape coded pixels of the block.

In another example, this disclosure describes a device for encoding video data, the device comprising: a memory configured to store the video data; and one or more processors configured to: determine palette indices of non-escape coded pixels of a block of the video data, wherein, for each respective non-escape coded pixel of the block, the palette index of the respective pixel indicates an entry in a palette, wherein each respective entry in the palette indicates a respective set of sample values; identify a series of runs in the block, the series of runs including two or more runs, each respective run of the series of runs consisting of one pixel or two or more consecutive pixels of the block, each pixel of each respective run of the series of runs having the same palette sample mode; generate a set of one or more palette run length syntax elements, wherein the one or more palette run length syntax elements indicate lengths of one or more runs in the series of runs; and generate a syntax element having a particular value indicating the set of palette run length syntax elements does not indicate a length of the first run of the series of runs.

In another example, this disclosure describes a device for decoding video data, the device comprising: means for obtaining a syntax element from a bitstream that comprises an encoded representation of a block of the video data, wherein the block comprises a series of runs, the series of runs including two or more runs, each respective run of the series of runs consisting of one pixel or two or more consecutive pixels of the block, each pixel of each respective run of the series of runs having the same palette sample mode; means for obtaining, from the bitstream, a set of one or more palette run length syntax elements, wherein the one or more palette run length syntax elements indicate lengths of one or more runs in the series of runs; means for determining, based on the syntax element having a particular value, that the set of palette run length syntax elements does not indicate a length of the first run of the series of runs; means for determining, based on the number of pixels in the block and the lengths indicated by the set of palette run syntax elements, the length of the first run of the series of runs; means for determining, based on the palette sample modes of the pixels of the block, palette indices of non-escape coded pixels of the block, wherein, for each respective non-escape coded pixel of the block, the respective palette index of the respective non-escape coded pixel indicates an entry in a palette, each respective entry in the palette indicating a respective set of sample values; and means for determining, based on the palette indices of the non-escape coded pixels of the block, values of the non-escape coded pixels of the block.

In another example, this disclosure describes a device for encoding video data, the device comprising: means for determining palette indices of non-escape coded pixels of a block of the video data, wherein, for each respective non-escape coded pixel of the block, the palette index of the respective non-escape coded pixel indicates an entry in a palette, wherein each respective entry in the palette indicates a respective set of sample values; means for identifying a series of runs in the block, the series of runs including two or more runs, each respective run of the series of runs consisting of one pixel or two or more consecutive pixels of the block, each pixel of each respective run of the series of runs having the same palette sample mode; means for generating a set of one or more palette run length syntax elements, wherein the one or more palette run length syntax elements indicate lengths of one or more runs in the series of runs; and means for generating a syntax element having a particular value indicating the set of palette run length syntax elements does not indicate a length of the first run of the series of runs.

In another example, this disclosure describes a data storage medium having instructions stored thereon that, when executed, cause a device for decoding video data to: obtain a syntax element from a bitstream that comprises an encoded representation of a block of the video data, wherein the block comprises a series of runs, the series of runs including two or more runs, each respective run of the series of runs consisting of one pixel or two or more consecutive pixels of the block, each pixel of each respective run of the series of runs having the same palette sample mode; obtain, from the bitstream, a set of one or more palette run length syntax elements, wherein the one or more palette run length syntax elements indicate lengths of one or more runs in the series of runs; determine, based on the syntax element having a particular value, that the set of palette run length syntax elements does not indicate a length of the first run of the series of runs; determine, based on the number of pixels in the block and the lengths indicated by the set of palette run syntax elements, the length of the first run of the series of runs; determine, based on the palette sample modes of the pixels of the block, palette indices of non-escape coded pixels of the block, wherein, for each respective non-escape coded pixel of the block, the respective palette index of the respective non-escape coded pixel indicates an entry in a palette, each respective entry in the palette indicating a respective set of sample values; and determine, based on the palette indices of the non-escape coded pixels of the block, values of the non-escape coded pixels of the block.

In another example, this disclosure describes a data storage medium having instructions stored thereon that, when executed, cause a device for encoding video data to: determine palette indices of non-escape coded pixels of a block of the video data, wherein, for each respective non-escape coded pixel of the block, the palette index of the respective non-escape coded pixel indicates an entry in a palette, wherein each respective entry in the palette indicates a respective set of sample values; identify a series of runs in the block, the series of runs including two or more runs, each respective run of the series of runs consisting of one pixel or two or more consecutive pixels of the block, each pixel of each respective run of the series of runs having the same palette sample mode; generate a set of one or more palette run length syntax elements, wherein the one or more palette run length syntax elements indicate lengths of one or more runs in the series of runs; and generate a syntax element having a particular value indicating the set of palette run length syntax elements does not indicate a length of the first run of the series of runs.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 6A is a flowchart illustrating an example operation of a video encoder, in accordance with a technique of this disclosure.

FIG. 6B is a flowchart illustrating an example operation of a video decoder, in accordance with a technique of this disclosure.

DETAILED DESCRIPTION

Figure 1:
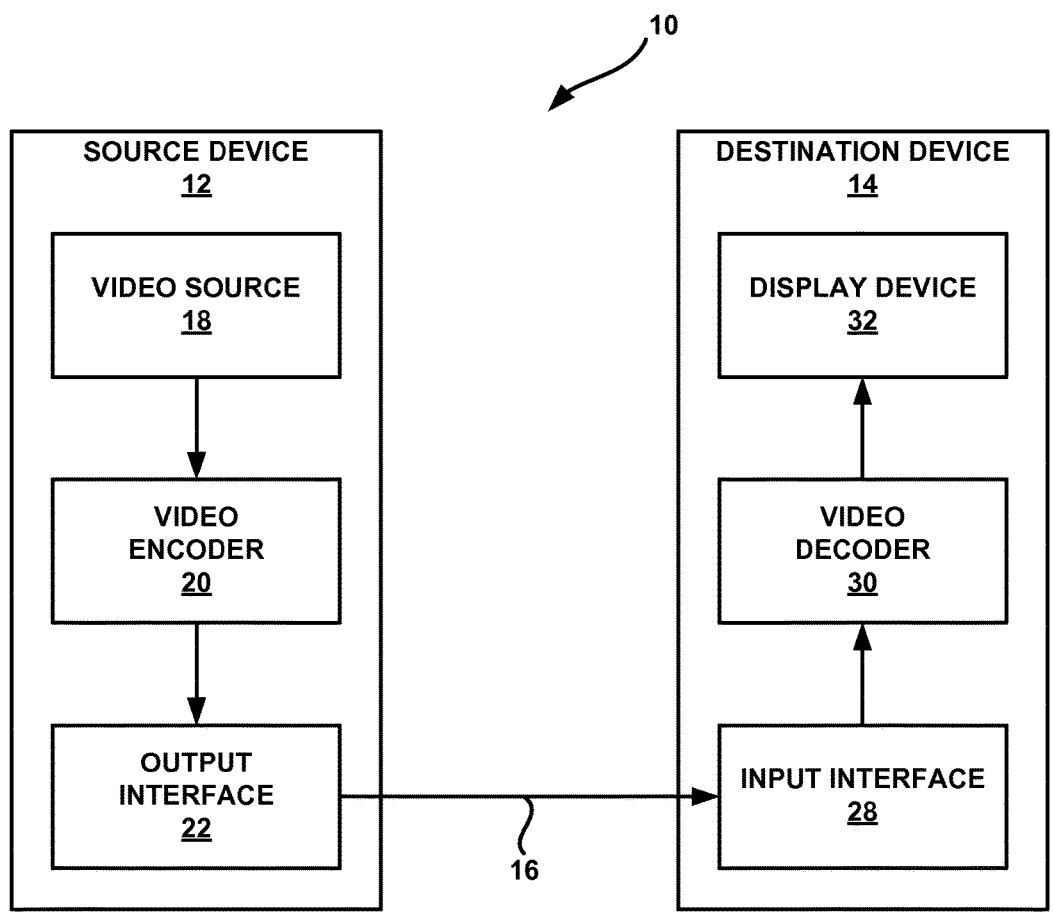
FIG. 1 is a block diagram illustrating an example video coding system that may utilize the techniques described in this disclosure.

This disclosure describes techniques for video coding and compression. In particular, this disclosure describes techniques for palette-based coding of video data. In traditional video coding, images are assumed to be continuous-tone and spatially smooth. Based on these assumptions, various tools have been developed such as block-based transform, filtering, etc., and such tools have shown good performance for natural content videos.

However, in applications like remote desktop, collaborative work and wireless display, computer generated screen content may be the dominant content to be compressed. This type of content tends to have discrete-tone and feature sharp lines, and high contrast object boundaries. The assumption of continuous-tone and smoothness may no longer apply, and thus, traditional video coding techniques may be inefficient ways to compress the computer generated screen content.

This disclosure describes palette-based coding, which may be particularly suitable for screen generated content coding (e.g., screen content coding (SCC)). The techniques for palette-based coding of video data may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based coding.

In palette-based coding, a particular area of video data may be assumed to have a relatively small number of colors. A video coder (i.e., a video encoder or video decoder) may code a so-called "palette" as a table of colors for representing the video data of the particular area (e.g., a given block). Each pixel may be associated with an entry in the palette that represents the color of the pixel. Thus, in palette-based coding, a palette may comprise the entries numbered by a respective index and representing color component (for example, RGB, YUV, or the like) values and/or intensities, which can be used as predictors for a block or as final reconstructed block samples. For example, the video coder may code an index (i.e., a "palette index" or "palette entry index") that relates the pixel to the appropriate value in the palette where the value is indicative of a color component and/or intensity component.

In the example above, a video encoder may encode a block of video data by determining a palette for the block, locating an entry in the palette to represent the value of each pixel, and encoding the palette with index values for the pixels relating the pixel value to the palette. A video decoder may determine a palette for a block as well as index values for pixels of the block. For example, the video decoder may obtain, from an encoded bitstream, a palette for a block, as well as index values for the pixels of the block. The video decoder may relate the index values of the pixels to entries of the palette to reconstruct the pixel values of the block. The example above is intended provide a general description of palette-based coding.

For example, a palette index may have a single associated color or intensity value associated with a single color or intensity component of a pixel (e.g., a Red component of RGB data, a Y component of YUV data, or the like). In another example, a palette index may have multiple associated color or intensity values. For instance, each entry in the palette may contain one color component (e.g., luma value) or two components (e.g., two chroma values), or three color components (e.g., RGB, YUV, etc.). In some instances, palette-based coding may be applied to code monochrome video. Accordingly, the term "color value" may generally refer to any color or non-color component used to generate a pixel value.

Each sample in a palette-coded block may belong to one of the three modes (i.e., palette sample modes), as set forth below:

Escape mode. In this mode, the sample value is not included in a palette as a palette entry and a quantized sample value is signaled explicitly for all color components. Escape mode is similar to the signaling of the new palette entries, although, in some examples, for new palette entries, the color component values are not quantized. Such samples may be referred to as escape samples or escape pixels.

"Copy Left Run" mode (also referred to as the "Index Copy palette sample mode," the "Copy Index palette sample mode," or "the Value palette sample mode"). In this mode, a palette index may be first signaled followed by value M, which means the following M palette indexes are the same as the one signaled.

"Copy Above Run" mode (also referred to as the "Copy Above palette sample mode," or the "CopyFromTop palette sample mode"). In this mode, a value N may be transmitted to indicate that for the following N palette indexes are the same as their above neighbors, respectively.

A run may be one pixel or a set of two or more consecutive pixels having the same palette sample mode. Furthermore, two run types are specified. Namely, a Copy Above run type (i.e., the "COPY_ABOVE run type") and a Copy Index run type (i.e., the "INDEX_COPY run type"). A run having the Copy Above run type may be referred to herein as a Copy Above run. A run having the Copy Index run type may be referred to herein as a Copy Index run or an Index Copy run. In some examples, each pixel in a run having the Copy Above run type has the Copy Above palette sample mode. Each pixel in a run having the Copy Index run type may has the Copy Index palette sample mode or the Escape palette sample mode. Thus, a Copy Index run may comprise a run of samples having palette indices copied from a left neighboring sample. In instances where escape pixels are indicated by special palette indices, a Copy Index run may be a run of escape pixels if a first pixel has the special palette index.

A run length value may be signaled for each run. The run length value may also be referred to as a "run value." Signaling index and run length value is similar to Run Length Coding. The run length value specifies the number of subsequent pixels that belong to the same palette sample mode. For example, if consecutive palette indices are 0, 2, 2, 2, 2, 5, for the second pixel, a Copy Index mode may be signaled. In this example, after signaling the palette index equal to 2 in the example above, a run length value of 3 is signaled signifying that the 3 subsequent pixels also have the same palette index (i.e., 2). Similarly, a run length value of 4 following Copy Above mode means that a total of 5 indices are copied from the corresponding palette indices above.

The techniques for palette-based coding of video data may be used with one or more other coding techniques, such as techniques for inter- or intra-predictive coding. For example, an encoder or decoder, or combined encoder-decoder (codec), may be configured to perform inter- and intra-predictive coding, as well as palette-based coding.

Typically, the video encoder signals a run length syntax element for each run of a block. In other words, there is a 1-to-1 relationship between the number of run length syntax elements and runs of the block. Each respective run length syntax element indicates a length of a respective run. In other words, each respective run length syntax element indicates a respective run length value.

This disclosure describes techniques in which it is not necessary to signal a run length syntax element for each respective run of a block. For instance, in some circumstances, a video decoder may be able to determine, based on the number of pixels of the block and the lengths of other runs, the length of the first or last run of the block without the signaling of a run length syntax element indicating the length of the first or last run. Thus, in at least some circumstances, it is not necessary for a video encoder to signal a run length syntax element indicating the length of the first or last run.

In general, more bins are required to represent run length syntax elements indicating longer runs. Hence, if the length of the first run is longer than the length of the last run, it may be advantageous to skip signaling of the run length syntax element indicating the length of the first run. Conversely, if the length of the last run is longer than the length of the first run, it may be advantageous to skip signaling of the run length syntax element indicating the length of the last run. Therefore, in accordance with an example technique of this disclosure, the video encoder may signal a syntax element indicating whether the run length syntax element for the first or last run is omitted.

Hence, in accordance with an example technique of this disclosure, a video encoder may determine palette indices of pixels of a block of video data. For each respective pixel of the block, the palette index of the respective pixel indicates an entry in a palette. Each respective entry in the palette indicates a respective set of sample values. Furthermore, in this example, the video encoder may identify a series of runs in the block. Each respective run of the series of runs may consist of one pixel or two or more consecutive pixels of the block. Each pixel of each respective run of the series of runs may have the same palette sample mode. In this example, the video encoder may generate a set of one or more palette run length syntax elements indicating lengths of one or more runs of the series of runs. Furthermore, in this example, the video encoder may generate a syntax element having a particular value indicating the set of palette run length syntax elements does not indicate a length of the first run of the series of runs.

In a similar example, a video decoder may obtain a syntax element from a bitstream that comprises an encoded representation of a block of video data. The block comprises a series of runs. The series of runs includes two or more runs. Each respective run of the series of runs may consist of one pixel or two or more consecutive pixels of the block. Each pixel of each respective run of the series of runs has the same palette sample mode. Furthermore, in this example, the video decoder may obtain, from the bitstream, a set of one or more palette run length syntax elements. The one or more palette run length syntax elements indicate lengths of one or more runs in the series of runs. In this example, the video decoder may determine, based on the syntax element having a particular value, that the set of palette run length syntax elements does not indicate a length of the first run of the series of runs. The video decoder may determine, based on the number of pixels in the block and the lengths indicated by the set of palette run syntax elements, the length of the first run of the series of runs. Furthermore, in this example, the video decoder may determine, based on the palette sample modes of the pixels of the block, palette indices of the pixels of the block. For each respective pixel of the block, the respective palette index of the respective pixel indicates an entry in a palette. Each respective entry in the palette indicates a respective set of sample values. The video decoder may determine, based on the palette indices of the pixels of the block, values of the pixels of the block.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, wireless communication devices, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data (e.g., video data) from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 of video coding system 10 represent examples of devices that may be configured to perform techniques for palette-based video coding in accordance with various examples described in this disclosure. For example, video encoder 20 and video decoder 30 may be configured to selectively code various blocks of video data, such as coding units (CUs) or prediction units (PUs) in High Efficiency Video Coding (HEVC), using either palette-based coding or non-palette based coding. Non-palette based coding modes may refer to various inter-predictive temporal coding modes or intra-predictive spatial coding modes, such as the various coding modes specified by Bross et al., "High Efficiency Video Coding (HEVC) Text Specification Draft 10 (for FDIS & Consent)," JCVC-L1003_v13, 12$^{th}$ Meeting of JCT-VC of ITU-T SG16 WP 3 and ISO/IEC JCT 1/SC 29/WG 11, 14-23 Jan. 2013 (hereinafter, "HEVC Draft 10"), available from: http://phenix.int-evry.fr/jct/doc_end_user/documents/12_Geneva/wg11/JCTVC-L1003-v13.zip. Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as High Efficiency Video Coding (HEVC). HEVC is a new video coding standard being developed by the Joint Collaboration Team on Video Coding (JCT-VC) of ITU-T Video Coding Experts Group (VCEG) and ISO/IEC Motion Picture Experts Group (MPEG). HEVC Draft 10 is a recent HEVC text specification draft.

In addition to the base HEVC standard, there are ongoing efforts to produce scalable video coding, multiview video coding, and 3D coding extensions for HEVC. In addition, palette-based coding modes, e.g., as described in this disclosure, may be provided for extension of the HEVC standard. For example, palette-based coding techniques are described in Rajan Joshi et al., "High Efficiency Video Coding (HEVC) Screen Content Coding: Draft 2," JCTVC-S1005, Sapporo, JP, 30 Jun.-9 Jul. 2014 (hereinafter "SCC Draft 2"). A copy of SCC Draft 2 is available at http://phenix.int-evry.fr/jct/doc_end_user/documents/19_Strasbourg/wg11/JCTVC-S1005-v1.zip. In some examples, the techniques described in this disclosure for palette-based coding may be applied to encoders and decoders configured to operation according to other video coding standards, such as the ITU-T-H.264/AVC standard or future standards. Accordingly, application of a palette-based coding mode for coding of coding units (CUs) or prediction units (PUs) in an HEVC codec is described for purposes of example.

In HEVC and other video coding standards, a video sequence typically includes a series of pictures. Pictures may also be referred to as "frames." A picture may include one or more sample array. For instance, a picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU. In monochrome pictures or pictures having three separate color planes, a PU may comprise a single prediction block and syntax structures used to predict the prediction block.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive blocks (e.g., predictive luma, Cb and Cr blocks) for one or more PUs of a CU, video encoder 20 may generate a residual block of the CU. Each sample in a residual block of the CU indicates a difference between a sample in a predictive block for a PU of the CU and a corresponding sample in a coding block of the CU. For example, video encoder 20 may generate a luma residual block of the CU. Each sample in the luma residual block of the CU indicates a difference between a luma sample in a predictive luma block of a PU of the CU and a corresponding sample in the luma coding block of the CU. In addition, video encoder 20 may generate a Cb residual block of the CU. Each sample in the Cb residual block of the CU may indicate a difference between a Cb sample in a predictive Cb block of a PU of the CU and a corresponding sample in the Cb coding block of the CU. Video encoder 20 may also generate a Cr residual block of the CU. Each sample in the Cr residual block of the CU may indicate a difference between a Cr sample in a predictive Cr block for a PU of the CU and a corresponding sample in the Cr coding block of the CU.

Furthermore, video encoder 20 may use quad-tree partitioning to decompose the residual blocks (e.g., luma, Cb and Cr residual blocks) of a CU into one or more transform blocks (e.g., luma, Cb and Cr transform blocks). A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the luma residual block of the CU. The Cb transform block may be a sub-block of the Cb residual block of the CU. The Cr transform block may be a sub-block of the Cr residual block of the CU. In monochrome pictures or pictures having three separate color planes, a TU may comprise a single transform block and syntax structures used to transform the samples of the transform block.

Video encoder 20 may apply one or more transforms to a transform block for a TU to generate a coefficient block for the TU. For example, video encoder 20 may apply one or more transforms to a luma transform block for a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU. A coefficient block may be a two-dimensional array of transform coefficients. A transform coefficient may be a scalar quantity.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for Supplemental Enhancement Information (SEI), and so on. NAL units that encapsulate RBSPs for video coding data (as opposed to RBSPs for parameter sets and SEI messages) may be referred to as video coding layer (VCL) NAL units.

In the example of FIG. 1, video decoder 30 receives a bitstream generated by video encoder 20. In addition, video decoder 30 may parse the bitstream to obtain syntax elements from the bitstream. As part of obtaining the syntax elements, video decoder 30 may apply CABAC decoding to particular syntax elements. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use intra prediction or inter prediction to determine predictive blocks of the PUs of a current CU. In addition, video decoder 30 may inverse quantize coefficient blocks for TUs of the current CU. Video decoder 30 may perform inverse transforms on the coefficient blocks to reconstruct transform blocks for the TUs of the current CU. Video decoder 30 may reconstruct the coding blocks of the current CU by adding the samples of the predictive blocks for PUs of the current CU to corresponding samples of the transform blocks for the TUs of the current CU. By reconstructing the coding blocks for each CU of a picture, video decoder 30 may reconstruct the picture.

As indicated above, video encoder 20 and video decoder 30 may apply CABAC coding. To apply CABAC encoding to a syntax element, video encoder 20 may binarize the syntax element to form a series of one or more bits, which are referred to as "bins." In addition, video encoder 20 may identify a coding context. The coding context may identify probabilities of coding bins having particular values. For instance, a coding context may indicate a 0.7 probability of coding a 0-valued bin and a 0.3 probability of coding a 1-valued bin. After identifying the coding context, video encoder 20 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, video encoder 20 may repeat these steps with the interval being the sub-interval associated with the value of the encoded bit. When video encoder 20 repeats these steps for the next bin, video encoder 20 may use modified probabilities based on the probabilities indicated by the identified coding context and the actual values of bins encoded.

When video decoder 30 performs CABAC decoding on a syntax element, video decoder 30 may identify a coding context. Video decoder 30 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, video decoder 30 may decode a bin having the value associated with the lower sub-interval. If the encoded value is within the upper sub-interval, video decoder 30 may decode a bin having the value associated with the upper sub-interval. To decode a next bin of the syntax element, video decoder 30 may repeat these steps with the interval being the sub-interval that contains the encoded value. When video decoder 30 repeats these steps for the next bin, video decoder 30 may use modified probabilities based on the probabilities indicated by the identified coding context and the decoded bins. The video decoder may then de-binarize the bins to recover the syntax element.

In some examples, video encoder 20 and video decoder 30 may be configured to perform palette-based coding. For example, in palette based coding, rather than performing the intra-predictive or inter-predictive coding techniques described above, video encoder 20 and video decoder 30 may code a so-called palette as a table of colors for representing the video data of the particular area (e.g., a given block). Thus, pixels may be associated with entries in the palette that represent the color of the pixels. For example, video encoder 20 and video decoder 30 may code an index that relates the pixel to an appropriate value in the palette.

Video encoder 20 may encode a block of video data by determining a palette for the block, locating an entry in the palette to represent the value of each pixel, and encoding the palette with index values for the pixels relating the pixel value to the palette. Video decoder 30 may obtain, from an encoded bitstream, a palette for a block, as well as index values for the pixels of the block. Video decoder 30 may relate the index values of the pixels to entries of the palette to reconstruct the pixel values of the block.

In this disclosure, it is assumed that each palette entry specifies the values for all color components of a pixel. However, the concepts of this disclosure are applicable to using a separate palette for each color component. Also, it is assumed that samples in a block are processed using horizontal raster scanning order. For example, the video encoder may convert a two-dimensional block of indices into a one-dimensional array by scanning the indices using a horizontal raster scanning order. Likewise, the video decoder may reconstruct a block of indices using the horizontal raster scanning order. Accordingly, this disclosure may refer to a previous sample as a sample that precedes the sample currently being coded in the block in the scanning order. It should be appreciated that scans other than a horizontal raster san, such as vertical raster scanning order, may also be applicable. The example above is intended provide a general description of palette-based coding. However, other scans such as vertical raster scanning order are also applicable.

The palette-based coding techniques may be configured for use with one or more video coding standards. For example, with respect to the HEVC framework, the palette-based coding techniques may be configured to be used as a CU mode. In other examples, the palette-based coding techniques may be configured to be used as a PU mode in the framework of HEVC. Accordingly, all of the following disclosed processes described in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Each sample in a block coded with a palette-based coding mode may be coded using one of the three palette sample modes: escape mode, Copy Above run mode, and Index Copy run mode. For Copy Above run mode and Index Copy run mode, a syntax element whose value indicates a run length may also be signaled. A run length value may indicate a number of one sample or two or more consecutive samples (e.g., a run of samples) in a particular scan order in a palette-coded block that are coded together.

A run length value may indicate a length of a run of indices that are coded using the same palette-coding mode. For example, with respect to the Index Copy run mode, a video coder (a video encoder or video decoder) may code a palette index and a run length value. In this example, the run length value indicates a number of one sample or two or more consecutive samples in a scan order that have the sample palette sample mode. For instance, a run length value may indicate a number of one sample or two or more consecutive samples in scan order that have the same index value and that are coded with the index value.

With respect to the Copy Above run mode, the video coder may code a run type indicator and a run length indicator. The run type indicator is an indication that a palette index for a sample is copied from a palette index of an above-neighboring sample (e.g., a sample that is positioned immediately above the sample currently being coded). The run length indicator indicates a number of one sample (or pixel) or two or more consecutive samples (or pixels) in a scan order that also copy a palette index from respective above-neighboring samples.

In SCC Draft 2, a syntax element indicating the number of signaled palette indices is signaled first, followed by each individual palette index value. A syntax element specifying a palette run type, e.g., COPY_ABOVE or INDEX_COPY, is then signaled in an interleaved pattern with a palette run length syntax element.

Particularly, SCC Draft 2 specifies a CU may include a palette_coding syntax structure containing syntax elements relating to palette coding. Table 1, below, shows a syntax defined in SCC Draft 2 for the palette_coding syntax structure.

TABLE 1

| palette_coding( x0, y0, nCbS ) { | Descriptor |
|---|---|
| ... | |
|   scanPos = 0 | |
|   while( scanPos < nCbS * nCbS ) { | |
|     xC = x0 + travScan[ scanPos ][ 0 ] | |
|     yC = y0 + travScan[ scanPos ][ 1 ] | |
|     if( scanPos > 0 ) { | |
|       xcPrev = x0 + travScan[ scanPos − 1 ][ 0 ] | |
|       ycPrev = y0 + travScan[ scanPos − 1 ][ 1 ] | |
|     } | |
|     if( indexMax > 0 && scanPos > = nCbS && palette_run_type_flag[ xcPrev ][ ycPrev ] | |
|       ! = COPY_ABOVE_MODE ) { | |
|       palette_run_type_flag[ xC ][ yC ] | ae(v) |
|     } | |
|     if( palette_run_type_flag[ xC ][ yC ] = = COPY_INDEX_MODE && | |
|       adjustedIndexMax > 0) | |
|       palette_index_idc | ae(v) |
|     if( indexMax > 0 ) { | |
|       maxPaletteRun = nCbS * nCbS − scanPos − 1 | |

TABLE 1-continued

| palette_coding( x0, y0, nCbS ) { | Descriptor |
|---|---|
|     if( maxPaletteRun > 0 ) { | |
|         palette_run_msb_id_plus1 | ae(v) |
|         if( palette_run_msb_id_plus1 > 1 ) | |
|             palette_run_refinement_bits | ae(v) |
|     } | |
|     } else | |
|         paletteRun = nCbS * nCbS − 1 | |
|     runPos = 0 | |
|     while ( runPos < = paletteRun ) { | |
|         xR = x0 + travScan[ scanPos ][ 0 ] | |
|         yR = y0 + travScan[ scanPos ][ 1 ] | |
|         if( palette_run_type_flag[ xC ][ yC ] = = COPY_INDEX_MODE && | |
|             paletteIndex = = indexMax ) { | |
|             PaletteSampleMode[ xR ][ yR ] = ESCAPE_MODE | |
|             PaletteIndexMap[ xR ][ yR ] = paletteIndex | |
|             for( cIdx = 0; cIdx < 3; cIdx++ ) { | |
|                 palette_escape_val | ae(v) |
|                 PaletteEscapeVal[ cIdx ][ xR ][ yR ] = palette_escape_val | |
|             } | |
|         } else if(palette_run_type_flag[ xC ][ yC ] = = COPY_INDEX_MODE ) { | |
|             PaletteSampleMode[ xR ][ yR ] = COPY_INDEX_MODE | |
|             PaletteIndexMap[ xR ][ yR ] = paletteIndex | |
|         } else { | |
|             PaletteSampleMode[ xR ][ yR ] = COPY_ABOVE_MODE | |
|             PaletteIndexMap[ xR ][ yR ] = PaletteIndexMap[ xR ][ yR − 1 ] | |
|         } | |
|         runPos++ | |
|         scanPos++ | |
|     } | |
|   } | |
| } | |

In Table 1, bold text indicates syntax elements. The syntax element palette_run_type_flag[xC][yC] is a run type indicator. As described in SCC Draft 2, palette_run_type_flag[xC][yC] equal to COPY_ABOVE_MODE specifies that the palette index for a sample at position [xC][yC] is equal to the palette index at the same location in the row above. palette_run_type_flag[xC][yC] equal to COPY_INDEX_MODE specifies that an indication of the palette index of the sample is coded in the bitstream. The array indices xC, yC specify the location (xC, yC) of the sample relative to the top-left luma sample of the picture. When palette_run_type_flag is not present, it is inferred to be equal to COPY_INDEX_MODE. Furthermore, in Table 1, the syntax element palette_index_idc specifies a palette entry index. As described in SCC Draft 2, palette_index_idc is an indication of an index to the array represented by currentPaletteEntries.

In Table 1, two syntax elements palette_run_msb_id_plus1 and palette_run_refinement_bits may be used to indicate a run length. As described in SCC Draft Text 2, the variable paletteRun specifies the number of consecutive locations minus 1 with the same palette index as the position in the above row when palette_run_type_flag is equal to COPY_ABOVE_MODE or specifies the number of consecutive locations minus 1 with the same palette index when palette_run_type_flag is equal to COPY_INDEX_MODE. Furthermore, in SCC Draft Text 2, palette_run_msb_id_plus1 minus 1 specifies the most significant bits in the binary representation of paletteRun. palette_run_refinement_bits specifies the refinement bits in the binary representation of paletteRun. When palette_run_refinement_bits is not present, it is inferred to be equal to 0. The variable paletteRun is derived as follows:

If indexMax is greater than 0
    If palette_run_msb_id_plus1 is greater than 1, paletteRun=(1<<(palette_run_msb_id_plus1−1))+palette_run_refinement_bits (7-80)

Otherwise (palette_run_msb_id_plus1 equal to 1) paletteRun is set to (palette_run_msb_id_plus1−1).

Otherwise, paletteRun is set to (nCbS*nCbS−1).

nCbS indicates the height or width of the coding block of the current CU. Thus, together, a palette_run_msb_id_plus1 syntax element and a palette_run_refinement_bits syntax element may indicate a palette run length.

Furthermore, in Table 1, the syntax element palette_escape_val specifies the quantized escape coded sample value for a component. The variable PaletteEscapeVal[cIdx][xC][yC] specifies an escape value of a sample for which paletteSampleMode[xC][yC] is equal to ESCAPE_MODE. The array index cIdx specifies the color component. As before, the array indices xC, yC specify the location (xC, yC) of the sample relative to the top-left luma sample of the picture. Thus, in Table 1, escape pixels are signaled in COPY_INDEX runs.

This disclosure describes methods, apparatuses, and techniques to signal and/or generally indicate palette run lengths while bypassing signaling (i.e., not signaling) of certain run length syntax elements to improve coding efficiency. In some examples, video encoder 20 and video decoder 30 may be configured to implement the palette run hiding techniques of this disclosure to the number of signaled palette indices that is transmitted at the beginning of a block. In other examples of this disclosure, video encoder 20 and video decoder 30 may be configured to implement techniques whereby the value of the number of palette indices to be used can be derived using some other known information concerning the coding characteristics of the block of video data. For example, if a syntax value indicating the palette run type is signaled, the number of signaled palette indices can be derived according to the techniques of this disclosure. The various techniques of this disclosure described below may be used individually or in any combination.

In one or more examples of this disclosure, video encoder 20 and video decoder 30 implement palette run hiding techniques that may be used to bypass signaling and/or receiving certain syntax elements used in palette-based video coding in order to improve video coding efficiency.

Techniques of this disclosure relate to palette-based video coding. For example, in palette-based coding, a video coder (a video encoder or video decoder) may form a "palette" as a table of colors for representing the video data of the particular area (e.g., a given block). Palette-based coding may be especially useful for coding areas of video data having a relatively small number of colors. Rather than coding actual pixel values (or their residuals), the video coder may code index values for one or more of the pixels that relate the pixels with entries in the palette representing the colors of the pixels. The techniques described in this disclosure may include techniques for palette run hiding.

In a first example of the disclosure, video encoder 20 may be configured to signal a block level syntax element (e.g., a flag) to indicate whether the first occurrence of a palette run length syntax element in the block is not signaled. This disclosure may refer to this block-level syntax element as a "run length skip syntax element." In another example, video encoder 20 may be configured to signal the block level syntax element to indicate whether the last occurrence of the palette run length syntax element in the block is not signaled. In the context of SCC Draft 2, palette_run_msb_id_plus1 and palette_run_refinement_bits are palette run length syntax elements.

Thus, in this example, video encoder 20 may determine palette indices of pixels of a block (e.g., a coding block of a CU) of video data. In this disclosure, discussion of pixels may apply to samples, and vice versa. For each respective pixel of the block, the palette index of the respective pixel indicates an entry in a palette. Each entry in the palette indicates a set of sample values. Video encoder 20 may identify a series of runs in the block. Each respective run of the series of runs may consist of one pixel or two or more consecutive pixels of the block. Each pixel of each respective run of the series of runs may have the same palette sample mode (e.g., escape mode, Copy Above mode, Copy Index mode). Furthermore, in this example, video encoder 20 may generate a set of one or more palette run length syntax elements. In this example, the one or more palette run length syntax elements indicate lengths of one or more runs in the series of runs. Furthermore, in this example, video encoder 20 may generate a run length skip syntax element having a particular value indicating the set of palette run length syntax elements does not indicate a length of the first run of the series of runs. In this example, the run length skip syntax element having a value other than the particular value (e.g., a second value) may indicate the set of palette run length syntax elements does not indicate a length of the last run of the series of runs.

In a similar example, video decoder 30 may obtain a run length skip syntax element from a bitstream that comprises an encoded representation of a block of video data. In this example, the block comprises a series of runs. The series of runs may include two or more runs. Each respective run of the series of runs may consist of one pixel or two or more consecutive pixels of the block. Each pixel of each respective run of the series of runs may have the same palette sample mode (e.g., escape mode, Copy Above mode, Index Copy mode). Furthermore, in this example, video decoder 30 may obtain, from the bitstream, a set of one or more palette run length syntax elements. The one or more palette run length syntax elements indicate lengths of one or more runs in the series of runs. In this example, video decoder 30 determines, based on the run length skip syntax element having a particular value (e.g., a first value), that the set of palette run length syntax elements does not indicate a length of the first run of the series of runs. Furthermore, in this example, video decoder 30 determines, based on the number of pixels in the block and the lengths indicated by the set of palette run syntax elements, the length of the first run of the series of runs. Additionally, in this example, video decoder 30 determines, based on the palette sample modes of the pixels of the block, palette indices of the pixels of the block. For each respective pixel of the block, the respective palette index of the respective pixel indicates an entry in a palette. Each respective entry in the palette indicates a respective set of sample values. Furthermore, in this example, video decoder 30 may determine, based on the palette indices of the pixels of the block, values of pixels of the block.

In this example, if the run length skip syntax element has a value other than the particular value (e.g., a second value), video decoder 30 may determine, based on the run length skip syntax element having the second value, that the set of palette run length syntax elements does not indicate a length of the last run of the series of runs. In this example, video decoder 30 may determine, based on the number of pixels in the block and the lengths indicated by the set of palette run syntax elements, the length of the last run of the series of runs. In this example, video decoder 30 may determine, based on the palette sample modes of the pixels of the block, palette indices of the pixels of the block. Furthermore, in this example, video decoder 30 may determine, based on the palette indices of the pixels of the block, values of pixels of the block.

In one example, video encoder 20 may be configured to bypass signaling (i.e., not signal) the above-described run length skip syntax element in the case that the palette size for the current block is one and there is no escape pixel in the block. Video encoder 20 may further be configured to bypass signaling (i.e., not signal) this run length skip syntax element in the case that the palette size for the current block is zero. In each of these instances, video decoder 30 may be configured to infer the run length to be the size of the entire block of video data. Thus, in this example, video encoder 20 may generate the run length skip syntax element in response to determining (1) the size of the palette is not equal to 1 or there is an escape pixel in the block; and (2) the size of the palette is not 0. Similarly, in this example, video decoder 30 may, in response to determining (1) the size of the palette is not equal to 1 or there is an escape pixel in the block; and (2) the size of the palette is not 0, determine the bitstream includes the syntax element.

In some examples, the above-described run length skip syntax element may be coded using CABAC with contexts. The context used may be based on one or more of the video block size, the palette size for the video block, the presence of escape pixels, the number of signaled and/or inferred palette indices, or other characteristics. Thus, in one such example, video encoder 20 may select a context from a plurality of contexts. In this example, the selection is based on at least one of: a block size of the block, a palette size, whether an escape pixel is present in the block, and a number of signaled palette indices in the block. Furthermore, in this example, video encoder 20 uses the selected context in CABAC to encode the run length skip syntax element. In a similar example, video decoder 30 selects a context from a plurality of contexts. In this example, the selection is based on at least one of: a block size of the block, a palette size, whether an escape pixel is present in the block, and a number of signaled palette indices in the block. Furthermore, in this example, video decoder 30 uses the selected context in CABAC to decode the run length skip syntax element.

At video decoder 30, if the above-described run length skip syntax element indicates the first occurrence of the palette run length syntax element in the block is skipped (i.e., is not received in the bitstream), video decoder 30 may temporarily assign a pseudo run length equal to 0 to the first run length and the decoding procedure continues until the last run length is decoded. In other words, if the run length skip syntax element indicates the set of palette run length syntax elements does not indicate the length of the first run of the block, video decoder 30 may initially assume the length of the first run is 0. Video decoder 30 may subsequently replace the first run length with a value equal to the total number of pixels in the block minus the position in the block after decoding the last pixel.

For example, assume that a block size of 4×4 has three signaled run lengths of (6, 2, 5). In this example, if the first run length is hidden (i.e., not signaled), video decoder 30 initially assigns the first run length a pseudo run length value of 0. After decoding the last run length 5, the current position in the 4×4 block is equals to: 1 (pixel position)+0 (pseudo run)+1 (pixel position)+2 (decoded run length)+1 (pixel position)+5 (decoded run length)=10. In this example, a run length indicates the number of pixel positions following a pixel having the same palette sample mode as each pixel in the run. Therefore, the first run length is recovered as 16−10=6, as 16 is the total number of pixels in the 4×4 block and 10 is the position in the block after decoding the last pixel.

In SCC Draft 2, if a pixel in the first line (e.g., a top row) of a block and the pixel is the first pixel of a run, video encoder 20 does not signal run type information for the run. For instance, video encoder 20 does not signal whether the run is a Copy Above run or a Copy Index run. In other words, in SCC Draft 2, the run type information is not signaled if the pixel is in the first line of the block. In this case, video decoder 30 may infer the run type to be Copy Index. However, in some examples of this disclosure, if the run length skip syntax element indicates that the first run length is bypassed, video encoder 20 may signal a palette run type for a run starting at a current pixel in the first line of the block, except if any of the following conditions are true:
  The current pixel is the first pixel in the block in scanning order. In this case, video decoder 30 may infer the run type to be COPY_ABOVE.
  The current pixel is not the first pixel in the block and the previously run type is COPY_ABOVE. Note, in some examples, the current run type can be inferred to be INDEX_COPY as there may be a normative restriction that a COPY_ABOVE run cannot be followed by another COPY_ABOVE run.

Thus, in one such example, when the set of palette run length syntax elements does not indicate the length of the first run of a block, video encoder 20 generates a palette run type syntax element (e.g., a palette_run_type_flag syntax element) for a particular run unless (1) a current pixel is the first pixel of the block in scanning order, or (2) the current pixel is not the first pixel of the block and a run type of a previous run has a Copy Above run type. In this example, the current pixel is in the first line of the block and is the first pixel of the particular run. When the current pixel is not the first pixel of the block and the previous run exists, the particular run follows the previous run and there is no other run between the particular run and the previous run. Furthermore, in this example, the run type syntax element indicates a palette sample mode for the particular run, where the palette sample mode is one of: Copy Above or Copy Index. For each respective pixel of a run having the Copy Above run type, a palette index of the respective pixel is the same as a palette index of a pixel immediately above the respective pixel. For each respective pixel of a run having the Index Copy run type, a palette index of the respective pixel is the same as a palette index of a pixel immediately left of the respective pixel.

In a similar example, responsive to determining the set of palette run length syntax elements does not indicate the length of the first run of the block, video decoder 30 obtains, from the bitstream, a run type syntax element unless (1) a current pixel is the first pixel of the block in scanning order, or (2) the current pixel is not the first pixel of the block and a run type of a previous run has a Copy Above run type. In this example, the current pixel is in the first line of the block and is the first pixel of the particular run. Furthermore, in this example, when the current pixel is not the first pixel of the block and the previous run exists, the particular run follows the previous run and there is no other run between the particular run and the previous run. Moreover, in this example, the palette run type syntax element indicates a run type of the particular run is one of: the Copy Above run type or an Index Copy run type.

In one such example, video decoder 30 obtains, from the bitstream, a run length skip syntax element. In this example, a block comprises a series of runs and the series of runs includes two or more runs. Furthermore, in this example, video decoder 30 obtains, from the bitstream, a set of one or more palette run length syntax elements. The one or more palette run length syntax elements indicate lengths of one or more runs in the series of runs. Furthermore, in this example, video decoder 30 determines, based on the run length skip syntax element having a particular value, that the set of palette run length syntax elements does not indicate a length of the first run of the series of runs. Additionally, in this example, video decoder 30 determines, based on the number of pixels in the block and the lengths indicated by the set of palette run syntax elements, the length of the first run of the series of runs. Furthermore, in this example, responsive to determining the set of palette run length syntax elements does not indicate the length of the first run of the series of runs and determining a current pixel is the first pixel of the block in scanning order, video decoder 30 infers the first run of the series of runs has a Copy Above run type. In this example, the current pixel is in the first line of the block and is the first pixel of the first run. As described elsewhere in this disclosure, for each respective pixel of a run having the Copy Above run type, the respective pixel has the Copy Above palette sample mode and, hence, a palette index of the respective pixel is the same as a palette index of a pixel immediately above the respective pixel. In this example, video decoder 30 determines, based on the palette sample modes of the pixels of the block, palette indices of the pixels of the block. In this example, video decoder 30 determines, based on the palette indices of the pixels of the block, values of pixels of the block.

In another such example, video decoder 30 obtains, from the bitstream, a run length skip syntax element. In this example, a block comprises a series of runs including two or more runs. Furthermore, in this example, video decoder 30 obtains, from the bitstream, a set of one or more palette run length syntax elements. The one or more palette run length syntax elements indicate lengths of one or more runs in the series of runs. Furthermore, video decoder 30 determines, based on the run length skip syntax element having a particular value, that the set of palette run length syntax elements does not indicate a length of the first run of the series of runs. In this example, video decoder 30 determines, based on the number of pixels in the block and the lengths indicated by the set of palette run syntax elements, the length of the first run of the series of runs. Furthermore, in this example, responsive to determining the set of palette run length syntax elements does not indicate the length of the first run of the series of runs and determining a current pixel is not the first pixel of the block in scanning order and a run type of a previous run is a Copy Above run type, video decoder 30 infers the first run of the series of runs has an Index Copy run type. In this example, the current pixel is in the first line of the block and is the first pixel of the particular run. In this example, the particular run follows the previous run and there is no other run between the particular run and the previous run. In this example, video decoder 30 determines, based on the palette sample modes of the pixels of the block, palette indices of the pixels of the block. Additionally, in this example, video decoder 30 determines, based on the palette indices of the pixels of the block, values of pixels of the block.

In accordance with some examples of the disclosure, when the first run length is bypassed (i.e., not signaled in the video bitstream) and the actual first run length and/or the last run length are equal to 0, video encoder 20 may be configured to not signal the run type of the last run. In this case, video decoder 30 may be configured to infer the run type.

In one such example, video encoder 20 may generate a set of one or more run type syntax elements. In this example, each respective run type syntax element of the set of run type syntax elements indicates a run type of a respective run in the series of runs. The run type of the respective run indicates the palette sample mode of pixels of the respective run. In this example, when the set of palette run length syntax elements does not indicate the length of the first run of the series of runs and responsive to determining that the length of the first run of the series of runs is equal to 0 and/or the length of the last run of the series of runs is equal to 0, the set of run type syntax elements does not include a run type syntax element indicating a run type of the last run in the series of runs.

Similarly, in one such example, video decoder 30 obtains, from the bitstream, a set of one or more run type syntax elements. In this example, each respective run type syntax element of the set of run type syntax elements indicates a run type of a respective run in the series of runs. The run type of the respective run indicates the palette sample mode of pixels of the respective run. Furthermore, in this example, responsive to determining the set of palette run length syntax elements does not indicate the length of the first run of the series of runs and responsive to determining that the length of the first run of the series of runs is equal to 0 and/or the length of the last run of the series of runs is equal to 0, video decoder 30 determines that the set of run type syntax elements does not include a run type syntax element indicating a run type of the last run in the series of runs.

In some examples of the disclosure, video encoder 20 may be configured to signal syntax elements according to a normative bitstream restriction that requires that the COPY_ABOVE run length must be greater than 0. Video decoder 30 would be configured to receive and parse syntax elements in accordance with this normative restriction. In one example, when coding the COPY_ABOVE run length equal to L, instead of encoding L, video encoder 20 may be configured to may encode L−1. The required parameter of the maximum possible run length may also be reduced by one. For example, in some proposals for SCC Draft 2, video encoder 20 may encode L with a parameter M specifying the maximum feasible run length (depending on the current pixel's position in the block). According to the techniques of this disclosure, video encoder 20 may be configured to encode L−1 with parameter M−1.

As an alternative to the above example, video encoder 20 may be configured to signal a syntax element (e.g., a flag) that indicates whether all of the COPY_ABOVE run lengths in the current block are greater than zero. If so, instead of signaling the actual COPY_ABOVE run length R, video encoder 20 may signal R−1. The syntax element in this example may be bypassed (i.e., not signaled) if the palette size of the current block is one and there are no escape pixels in the block, or if the palette size of the current block is zero. In such cases, the run length may be inferred to be the whole block. The syntax element that indicates whether all of the COPY_ABOVE run lengths in the current block are greater than zero may be coded using CABAC with contexts. The context used may be based on one or more of the video block size, the palette size for the video block, the presence of escape pixels, the number of signaled and/or inferred palette indices, or other characteristics.

Thus, in one such example, a block may have a series of runs. In this example, video encoder 20 generates a syntax element indicating whether all runs of the series of runs having a Copy Above run type have lengths greater than 0. In this example, when the syntax element indicates all runs of the series of runs having the Copy Above run type have lengths greater than 0, for each respective run of the series of runs having the Copy Above run type, a respective palette run length syntax element of the set of palette run length syntax element is 1 less than the actual length of the respective run.

In a similar example, a block has a series of runs. In this example, video decoder 30 obtains a syntax element from the bitstream. In this example, the syntax element indicates whether all runs of the series of runs having a Copy Above run type have lengths greater than 0. In this example, responsive to determining the syntax element indicates all runs of the series of runs having the Copy Above run type have lengths greater than 0, video decoder 30 determines, for each respective run of the series of runs having the Copy Above run type, a respective palette run length syntax element of the set of palette run length syntax element is 1 less than the actual length of the respective run.

According to some proposals for SCC Draft 2, if all of the COPY_ABOVE run lengths in the current block are greater than 0, the combination (run type, run length)= (COPY_ABOVE, 0) is invalid in the current block. Therefore, this disclosure proposes to use this combination (i.e., (run type, run length)=(COPY_ABOVE, 0)) to indicate that the current INDEX_COPY run length is bypassed (e.g., not signaled). For example, assume that the block size is 4×4, and there are three signaled INDEX_COPY run lengths, which are (6, 2, 5). If video decoder 30 receives the combination (INDEX_COPY, 6) (COPY_ABOVE, 0), (INDEX_COPY, 5), video decoder 30 may be configured to recover the actual sequences as: (INDEX_COPY, 6) (INDEX_COPY, 16-3-5-6), (INDEX_COPY, 5). In this example, the value 3 can be derived from the number of signaled runs.

Thus, in one such example, a block comprises a series of runs that includes two or more runs. Each respective run of the series of runs may consist of one pixel or two or more consecutive pixels of the block. Each pixel of each respective run of the series of runs has the same palette sample mode. In this example, video decoder 30 obtains, from the bitstream, a set of one or more palette run length syntax elements. The one or more palette run length syntax elements indicate lengths of one or more runs in the series of runs. In this example, one of the following applies:
    the bitstream is subject to a requirement that each run of the series of runs having a Copy Above run type has a length greater than 0, and
    the bitstream includes a syntax element indicating all runs of the series of runs having the Copy Above run type have lengths greater than 0.
In this example, in response to obtaining, from the bitstream, a run type syntax element indicating a particular run of the series of runs has the Copy Above run type and a palette run length syntax element of the set of palette run length syntax elements indicating a length of the particular run is 0, video decoder 30 determines the particular run actually has an Index Copy run type and the length of the particular run actually is equal to a total number of pixels in the block minus the lengths of each other run of the series of runs minus the number of runs in the series of runs.

The above techniques may be applied in combination. For example, as there is at most one combination of (COPY_ABOVE, 0) in the method of discussed above, after video decoder 30 decodes the combination (COPY_ABOVE, 0), the techniques related to the normative restrictions discussed above may be applied.

As described above, in palette mode, a palette includes entries numbered by an index representing color component values that can be used as predictors for block samples or as final reconstructed block samples. Furthermore, as briefly described above, samples in the palette block may be coded using three run-modes, i.e. Copy-Left (i.e., Index Copy), Copy Above, and escape, or equivalents thereof. Video encoder 20 may signal a one bin palette_mode flag in the bitstream to indicate whether the mode is COPY_ABOVE run mode or not. If the mode is not COPY_ABOVE run mode, video encoder 20 signals a palette_index syntax element. If palette_index is equal to a reserved palette index value, the current pixel is an escape pixel. For instance, if the palette_index is equal to palette_size, the current pixel is an escape pixel. Otherwise, the current pixel is the starting position of an INDEX mode (i.e., the Index Copy run mode). "Non-CE6: Escape color signaling," document no. JCTVC-S0055 (hereinafter, JCTVC-S0055") proposed to code the escape pixel as a pair of (palette mode=COPY_ABOVE and palette_run=0). If the current pixel is the beginning of a COPY_ABOVE run, the value of palette_run is one plus the actual run length so that the decoder can tell between COPY_ABOVE and ESCAPE. In some instances, the technique of JCTVC-S0055 may reduce the number of bits required to indicate that the current pixel is an escape pixel.

However, because for COPY_ABOVE run mode, zero run length is the most probable case, reserving the zero run length for ESCAPE may result in coding efficiency loss. For instance, in one example, in the technique of JCTVC-S0055, if a value of a palette_run syntax element is represented using a unary value terminated by a 0, an escape pixel is signaled with a palette run syntax element represented using the unary value 0 and a zero run length is signaled with a palette run syntax element represented using a unary value 10. However, run lengths of zero may be more common than escape pixels. Thus, in this example, a result of the techniques of JCTVC-S0055 may be that a video encoder signals more palette_run syntax elements represented using unary values equal to 10 than palette_run syntax elements represented using unary values equal to 0, resulting in coding efficiency loss.

In accordance with one or more techniques of this disclosure, video encoder 20 signals escape mode as a pair of:
    palette_mode=COPY_ABOVE and palette_run is equal to a predetermined value greater than 0. In some examples, palette_run=1 or 2.

In some examples, COPY_ABOVE runs having lengths greater than or equal to a predetermined value greater than 0 (e.g., 1 or 2) may be less common than escape pixels and/or less common than COPY_ABOVE runs with lengths equal to 0. Hence, in such examples, signaling an escape pixel as palette_mode being equal to COPY_ABOVE and palette_run being equal to the predetermined value may increase coding efficiency vis-à-vis the techniques of JCTVC-S0055.

As an example of the techniques of this disclosure, if escape mode is signalled as COPY_ABOVE and palette_run=1, then for the real COPY_ABOVE mode, the palette_run syntax is mapped to:
    If the run length is equal to 0, then palette_run=0
    If the run length is greater than 1, then palette_run=run length+1.

As another example of the techniques of this disclosure, if escape mode is signalled as COPY_ABOVE and palette_run=2, then for the real COPY_ABOVE mode, the palette_run syntax is mapped to:
    If the run length is equal to 0, then palette_run=0
    If the run length is equal to 1, then palette_run=1
    If the run length is greater than 1, then palette_run=run length+1.

Thus, in accordance with one or more techniques of this disclosure, video decoder 30 may obtain, from a bitstream that comprises an encoded representation of video data, a first syntax element (e.g., palette_mode) and a second syntax element (e.g., run_length). When the first syntax element is equal to a first value and the second syntax element is equal to a predetermined value greater than 0, it is determined that a current pixel of the video data is an escape pixel. In at least some examples, if the current pixel is an escape pixel, a value of the current pixel is not included in a palette. If the current pixel is not an escape pixel, the value of the current pixel is included in the palette. Furthermore, in this example, when the first syntax element is equal to the first value and the second syntax element is not equal to the predetermined value, video decoder 30 may determine that the value of the current pixel is equal to a value of a pixel immediately above the current pixel in a current picture. Additionally, when the first syntax element is equal to the first value and the second syntax element is not equal to the predetermined value, video decoder 30 may determine, based on the value of the second syntax element, a run length indicating a number of pixels following the current pixel in a current block in a decoding order that have the same value as above neighboring pixels.

In some examples, when the value of the first syntax element is equal to a second, different value, video decoder 30 may obtain a third syntax element from the bitstream, the third syntax element indicating an index into the palette. Additionally, when the first syntax element is equal to the second value, video decoder 30 may determine that the value of the current pixel is equal to a value specified by an entry in the palette corresponding to the index.

As indicated above, video decoder 30 may determine a run length based on the value of the second syntax element (e.g., run_length). In some examples, when the value of the second syntax element is less than the predetermined value, video decoder 30 may determine that the run length is equal to the value of the second syntax element. In this example, when the value of the second syntax element is greater than the predetermined value, video decoder 30 may determine that the run length is equal to the value of the second syntax element plus 1.

For instance, in one example, the predetermined value is equal to 1. In this example, when the value of the second syntax element is equal to 0, video decoder 30 may determine that the run length is equal to 0. When the value of the second syntax element is greater than 1, video decoder 30 may determine that the run length is equal to the value of the second syntax element plus 1.

In another example, the predetermined value is equal to 2. In this example, when the value of the second syntax element is equal to 0, video decoder 30 may determine that the run length is equal to 0. When the value of the second syntax element is equal to 1, video decoder 30 may determine that the run length is equal to 1. When the value of the second syntax element is greater than 2, video decoder 30 may determine that the run length is equal to the value of the second syntax element plus 1.

Furthermore, in accordance with one or more techniques of this disclosure, video encoder 20 may include, in a bitstream that comprises an encoded representation of the video data, a first syntax (e.g., palette_mode) and a second syntax element (e.g., run_length). When a current pixel of the video data is an escape pixel, the first syntax element is equal to a first value and the second syntax element is equal to a predetermined value greater than 0. If the current pixel is an escape pixel, a value of the current pixel is not included in a palette. If the current pixel is not an escape pixel, the value of the current pixel is included in the palette. When the value of the current pixel is equal to a value of a pixel immediately above the current pixel in a current picture, the first syntax element is equal to the first value and the second syntax element is not equal to the predetermined value. Furthermore, when the value of the current pixel is equal to a value of a pixel immediately above the current pixel in a current picture, a run length is determinable (e.g., by video decoder 30) from the value of the second syntax element, the run length indicating a number of pixels following the current pixel in a decoding order that have the same values as above neighboring pixels.

Furthermore, in some examples, when the first syntax element is equal to a second, different value, video encoder 20 may include a third syntax element from the bitstream, the third syntax element indicating an index into the palette. The value of the current pixel is equal to a value specified by an entry in the palette corresponding to the index.

In some examples, when the value of the second syntax element (e.g., run_length) is less than the predetermined value, the run length is equal to the value of the second syntax element. In such examples, when the value of the second syntax element is greater than the predetermined value, the run length is equal to the value of the second syntax element plus 1. For instance, in one example, the predetermined value is equal to 1. In this example, when the value of the second syntax element is equal to 0, the run length is equal to 0. When the value of the second syntax element is greater than 1, the run length is equal to the value of the second syntax element plus 1.

In another example, the predetermined value is equal to 2. In this example, when the value of the second syntax element is equal to 0, the run length is equal to 0. When the value of the second syntax element is equal to 1, the run length is equal to 1. When the value of the second syntax element is greater than 2, the run length is equal to the value of the second syntax element plus 1.

The context of the palette_run when palette_mode is equal to COPY_ABOVE may depend on palette_escape_val_present_flag and/or palette_size and/or CU size. The palette_escape_val_present_flag may indicate the presence of escape samples in a current block (e.g., CU, PU). All of the syntax palette_escape_val may be signalled at the end of the current CU to reduce parsing dependency. A palette_escape_val syntax element may indicate a value of an escape pixel.

Thus, in some examples, video decoder 30 may select, based on a value of a syntax element specifying whether escape pixels are present in the current block, an entropy coding context. Video decoder 30 may entropy decode (e.g., CABAC decode) the first syntax element using the selected entropy coding context. Similarly, video encoder 20 may select, based on whether escape pixels are present in the current block, an entropy coding context. Video encoder 20 may entropy encode (e.g., CABAC encode) the first syntax element using the selected entropy coding context.

Figure 2:
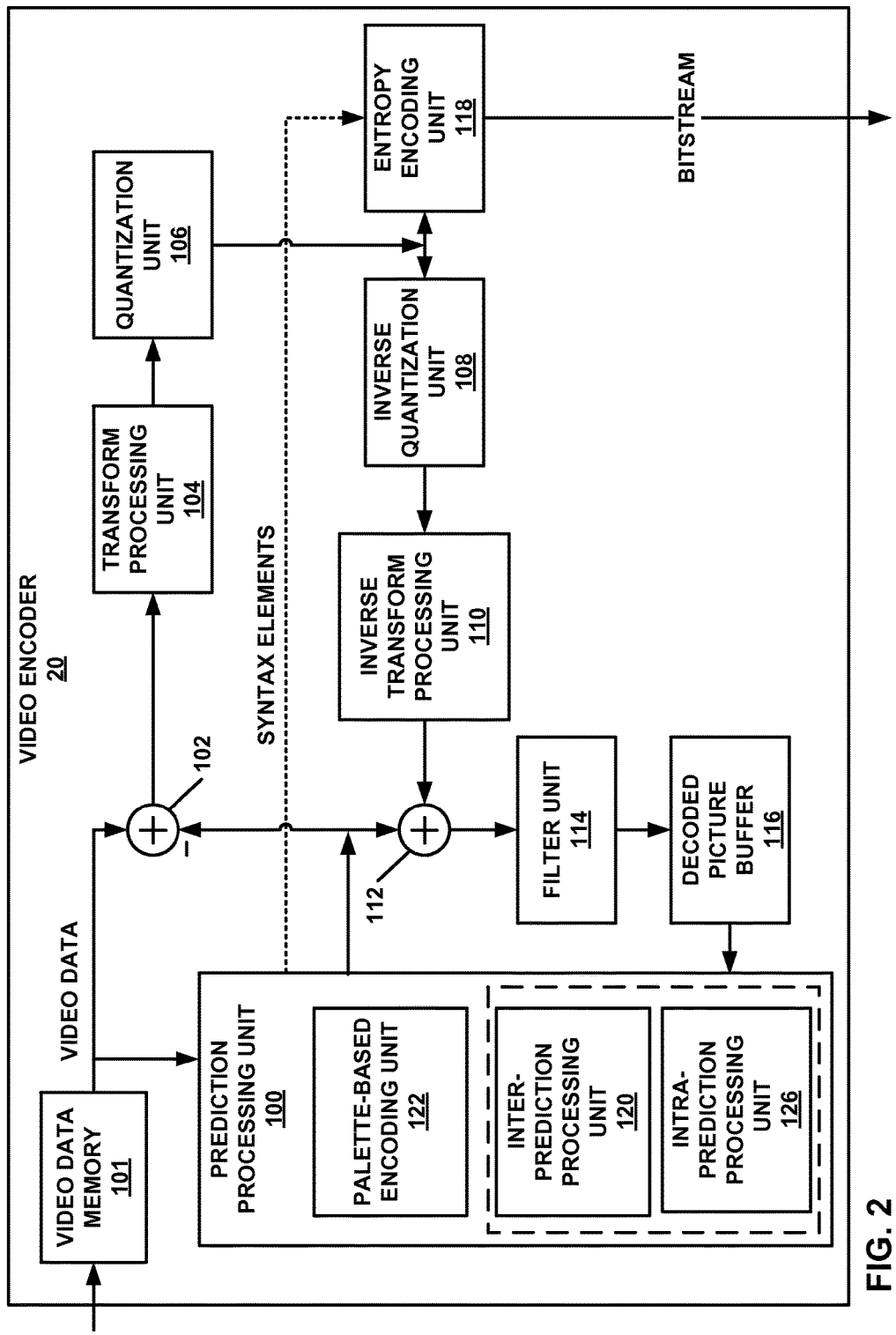
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively code various blocks of video data, such as CUs or PUs in HEVC coding, using either palette-based coding or non-palette-based coding. Non-palette-based coding modes may refer to various inter-predictive temporal coding modes or intra-predictive spatial coding modes, such as the various coding modes specified by HEVC Draft 10. In one example, video encoder 20 is configured to generate a palette having entries indicating pixel values, select pixel values in a palette to represent pixels values of at least some pixel locations in a block of video data, and signal information associating at least some of the pixel locations in the block of video data with entries in the palette corresponding, respectively, to the selected pixel values in the palette. The signaled information may be used by video decoder 30 to decode video data.

In the example of FIG. 2, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video data memory 101 is configured to store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU.

In accordance with various examples of this disclosure, video encoder 20 may be configured to perform palette-based coding. With respect to the HEVC framework, as an example, the palette-based coding techniques may be configured to be used as a CU mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based decoding when a palette-based encoding mode is selected, e.g., for a CU or PU. For example, palette-based encoding unit 122 may be configure to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

According to aspects of this disclosure, palette-based encoding unit 122 may be configured to perform any combination of the techniques for palette coding described with respect to FIGS. 4-5 below. For instance, palette-based encoding unit 122 may be configured to perform any combination of the techniques for palette run hiding described herein.

Furthermore, in accordance with an example technique of this disclosure, palette-based encoding unit 122 may determine palette indices of non-escape coded pixels of a block of the video data. Furthermore, palette-based encoding unit 122 may identify a series of two or more runs in the block. Each respective run of the series of runs may include of one pixel or two or more consecutive pixels of the block. Each pixel of each respective run of the series of runs may have the same palette sample mode. Additionally, palette-based encoding unit 122 may generate a set of one or more palette run length syntax elements. The one or more palette run length syntax elements may indicate lengths of one or more runs in the series of runs. Palette-based encoding unit 122 may generate a syntax element having a particular value indicating the set of palette run length syntax elements does not indicate a length of the first run of the series of runs.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Figure 3:
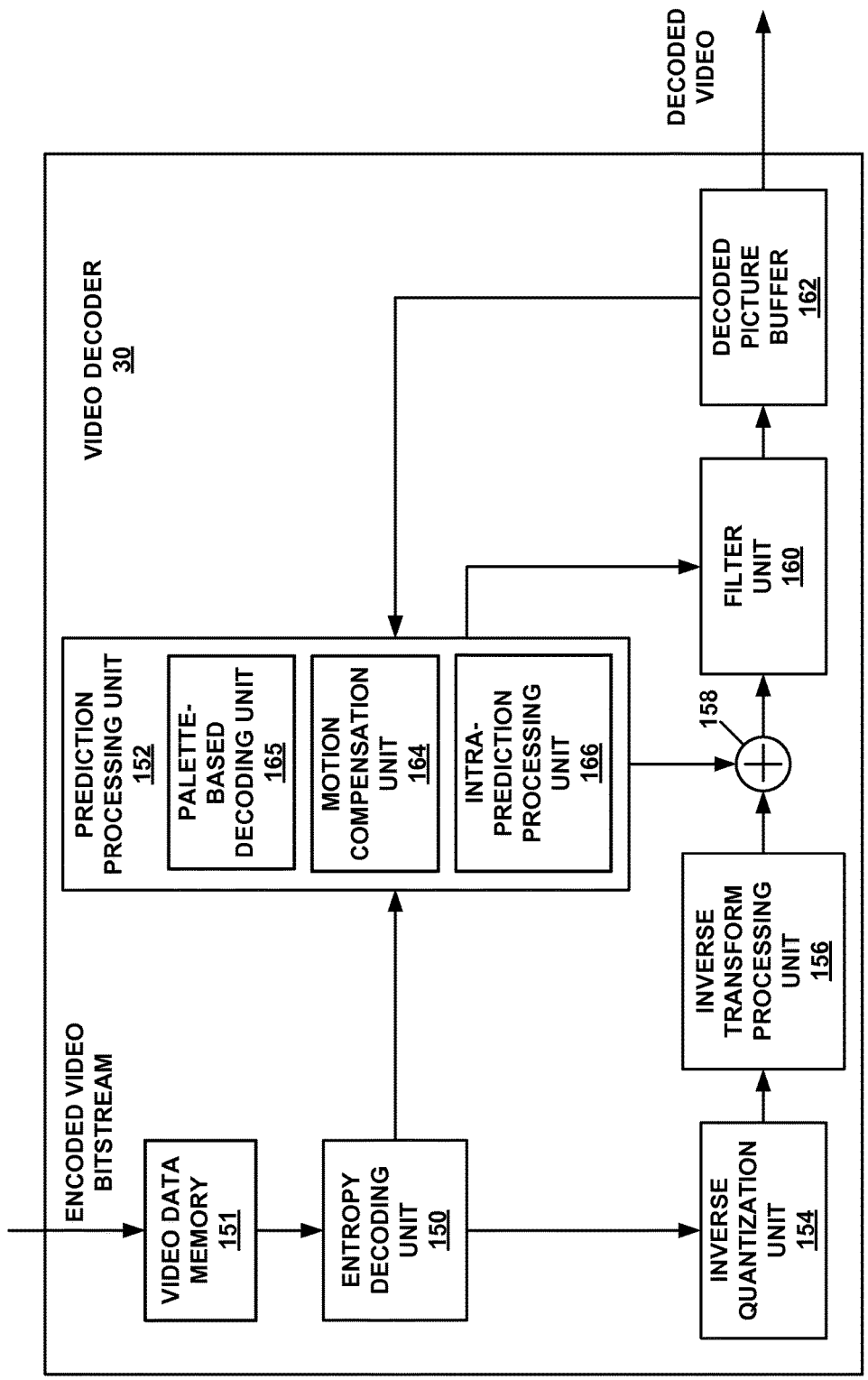
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video decoder 30 represents an example of a device that may be configured to perform techniques for palette-based video coding in accordance with various examples described in this disclosure. For example, video decoder 30 may be configured to selectively decode various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Draft 10. Video decoder 30, in one example, may be configured to generate a palette having entries indicating pixel values, receive information associating at least some pixel locations in a block of video data with entries in the palette, select pixel values in the palette based on the information, and reconstruct pixel values of the block based on the selected pixel values in the palette.

In the example of FIG. 3, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

Video data memory 151 is configured to store encoded video data, such as an encoded video bitstream, to be decoded by the components of video decoder 30. The video data stored in video data memory 151 may be obtained, for example, from channel 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory configured to store decoded (e.g., reference) video data, e.g., for use in decoding video data by video decoder 30, e.g., in intra- or inter-coding modes and/or output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

Video data memory 151 receives and stores encoded video data (e.g., NAL units) of a bitstream. Entropy decoding unit 150 may receive encoded video data (e.g., NAL units) from the CPB and parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples at the one or more reference regions for the PU, predictive luma, Cb and Cr blocks for the PU.

Reconstruction unit 158 may use transform blocks for TUs of a CU and the predictive blocks of the PUs of the CU, i.e., either intra-prediction data or inter-prediction data, as applicable, to reconstruct the coding blocks for the CU. For example, reconstruction unit 158 may add samples of the transform blocks to corresponding samples of the predictive blocks to reconstruct the coding blocks of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Video decoder 30 may be configured to perform palette-based coding. For example, palette-based decoding unit 165 may perform palette-based decoding when a palette-based decoding mode is selected, e.g., for a CU or PU. For example, palette-based decoding unit 165 may generate a palette having entries indicating pixel values, receive information associating at least some pixel locations in a block of video data with entries in the palette, select pixel values in the palette based on the information, and reconstruct pixel values of the block based on the selected pixel values in the palette. Although various functions are described as being performed by palette-based decoding unit 165, some or all of such functions may be performed by other processing units, or a combination of different processing units.

Palette-based decoding unit 165 may receive palette sample mode information, and perform the above operations when the palette sample mode information indicates that the palette sample mode applies to the block. When the palette sample mode information indicates that the palette sample mode does not apply to the block, or when other mode information indicates the use of a different mode, palette-based decoding unit 165 decodes the block of video data using a non-palette based coding mode, e.g., such an HEVC inter-predictive or intra-predictive coding mode. The block of video data may be, for example, a CU or PU generated according to an HEVC coding process. The palette-based coding mode may comprise one of a plurality of different palette-based coding modes, or there may be a single palette-based coding mode.

In accordance with some examples of this disclosure, palette-based decoding unit 165 may be configured to perform the run hiding techniques discussed above. For instance, entropy decoding unit 150 may obtain a syntax element from a bitstream that comprises an encoded representation of a block of video data. The block may comprise a series of runs, the series of runs including one or more runs. Each respective run of the series of runs may consist of one pixel or two or more consecutive pixels of the block. Furthermore, entropy decoding unit 150 may obtain, from the bitstream, a set of one or more palette run length syntax elements. The one or more palette run length syntax elements indicate lengths of one or more runs in the series of runs. Palette-based decoding unit 165 may determine, based on the syntax element having a particular value, that the set of palette run length syntax elements does not indicate a length of the first run of the series of runs. Additionally, palette-based decoding unit 165 may determine, based on the number of pixels in the block and the lengths indicated by the set of palette run syntax elements, the length of the first run of the series of runs. Furthermore, palette-based decoding unit 165 may determine, based on the palette sample modes of the pixels of the block, palette indices of non-escape coded pixels of the block. For each respective non-escape coded pixel of the block, the respective palette index of the respective non-escape coded pixel indicates an entry in a palette. Each respective entry in the palette may indicate a respective set of sample values. Furthermore, palette-based decoding unit 165 may determine, based on the palette indices of the non-escape coded pixels of the block, values of the non-escape coded pixels of the block.

According to aspects of this disclosure, palette-based decoding unit 165 may be configured to perform any combination of the techniques for palette coding described with respect to FIGS. 4-5 below.

Figure 4:
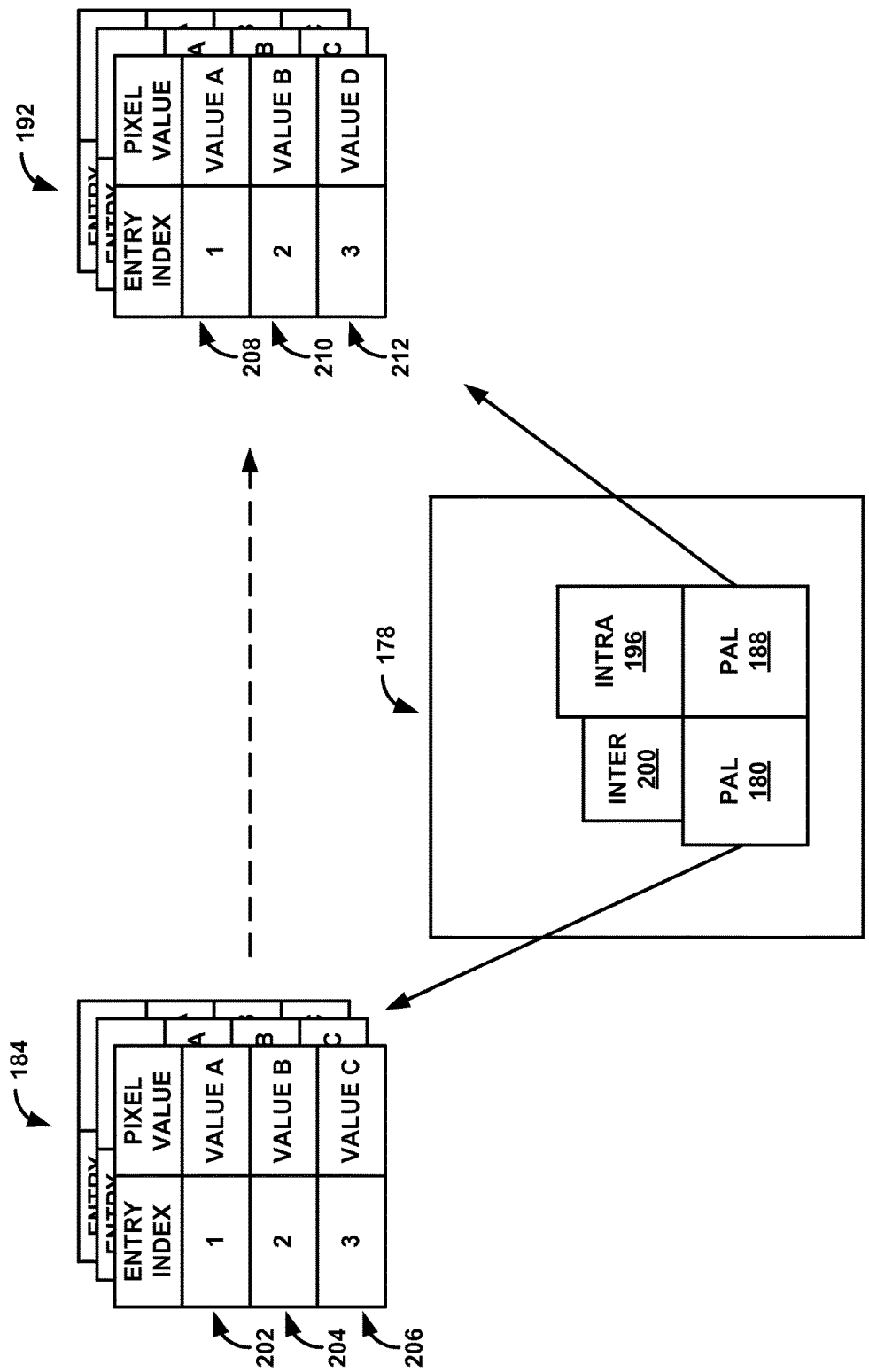
FIG. 4 is a conceptual diagram illustrating an example of determining palette entries for palette-based video coding, consistent with techniques of this disclosure.

FIG. 4 is a conceptual diagram illustrating an example of determining a palette for coding video data, consistent with techniques of this disclosure. The example of FIG. 4 includes a picture 178 having a first CU 180 that is associated with first palettes 184 and a second CU 188 that is associated with second palettes 192. As described in greater detail below and in accordance with the techniques of this disclosure, second palettes 192 are based on first palettes 184. Picture 178 also includes block 196 coded with an intra-prediction coding mode and block 200 that is coded with an inter-prediction coding mode.

The techniques of FIG. 4 are described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded, CU 188 in the example of FIG. 4. First palettes 184 and second palettes 192 are shown as including multiple palettes. In some examples, according to aspects of this disclosure, a video coder (such as video encoder 20 or video decoder 30) may code palettes separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU.

In other examples, video encoder 20 may encode a single palette for all color components of a CU. In this example, video encoder 20 may encode a palette having an i-th entry that is a triple value, including $Y_i$, $U_i$, and $V_i$. In this case, the palette includes values for each of the components of the pixels. Accordingly, the representation of palettes 184 and 192 as a set of palettes having multiple individual palettes is merely one example and not intended to be limiting.

In the example of FIG. 4, first palettes 184 includes three entries 202-206 having entry index value 1, entry index value 2, and entry index value 3, respectively. Entries 202-206 relate the index values to pixel values including pixel value A, pixel value B, and pixel value C, respectively. As described herein, rather than coding the actual pixel values of first CU 180, a video coder (such as video encoder 20 or video decoder 30) may use palette-based coding to code the pixels of the block using the indices 1-3. That is, for each pixel position of first CU 180, video encoder 20 may encode an index value for the pixel, where the index value is associated with a pixel value in one or more of first palettes 184. Video decoder 30 may obtain the index values from a bitstream, or otherwise determine the index values based on syntax elements in the bitstream, and reconstruct the pixel values using the index values and one or more of first palettes 184. Thus, first palettes 184 are transmitted by video encoder 20 in an encoded video data bitstream for use by video decoder 30 in palette-based decoding.

In some examples, video encoder 20 and video decoder 30 may use one or more syntax elements that indicate the maximum palette size. In some examples, the maximum palette size may be based on the particular profile, level, or bit-depth of the video data being coded. In other examples, video encoder 20 and video decoder 30 may use the one or more syntax elements that indicate the maximum palette size and the maximum palette size may be based on a size of the block being coded, such as CU 180.

In an example for purposes of illustration, video encoder 20 and video decoder 30 may use the data indicating a maximum palette size when constructing first palettes 184 for CU 180. For example, video encoder 20 and video decoder 30 may continue to add entries to first palettes 184 until reaching the maximum palette size indicated by the data. Video encoder 20 and video decoder 30 may then code CU 180 using the constructed first palettes 184.

In some examples, video encoder 20 and video decoder 30 may determine second palettes 192 based on first palettes 184. For example, video encoder 20 and/or video decoder 30 may locate one or more blocks from which the predictive palettes, in this example, first palettes 184, are determined. The combination of entries being used for purposes of prediction may be referred to as a predictor palette. In some examples, such as the example illustrated in FIG. 4, video encoder 20 and/or video decoder 30 may locate the previously coded CU such as a left neighboring CU (first CU 180) when determining a predictive palette for second CU 188.

In the example of FIG. 4, second palettes 192 include three entries 208-212 having entry index value 1, entry index value 2, and entry index value 3, respectively. Entries 208-212 relate the index values to pixel values including pixel value A, pixel value B, and pixel value D, respectively. In this example, video encoder 20 may code one or more syntax elements indicating which entries of first palettes 184 (representing a predictor palette, although the predictor palette may include entries of a number of blocks) are included in second palettes 192.

Figure 5:
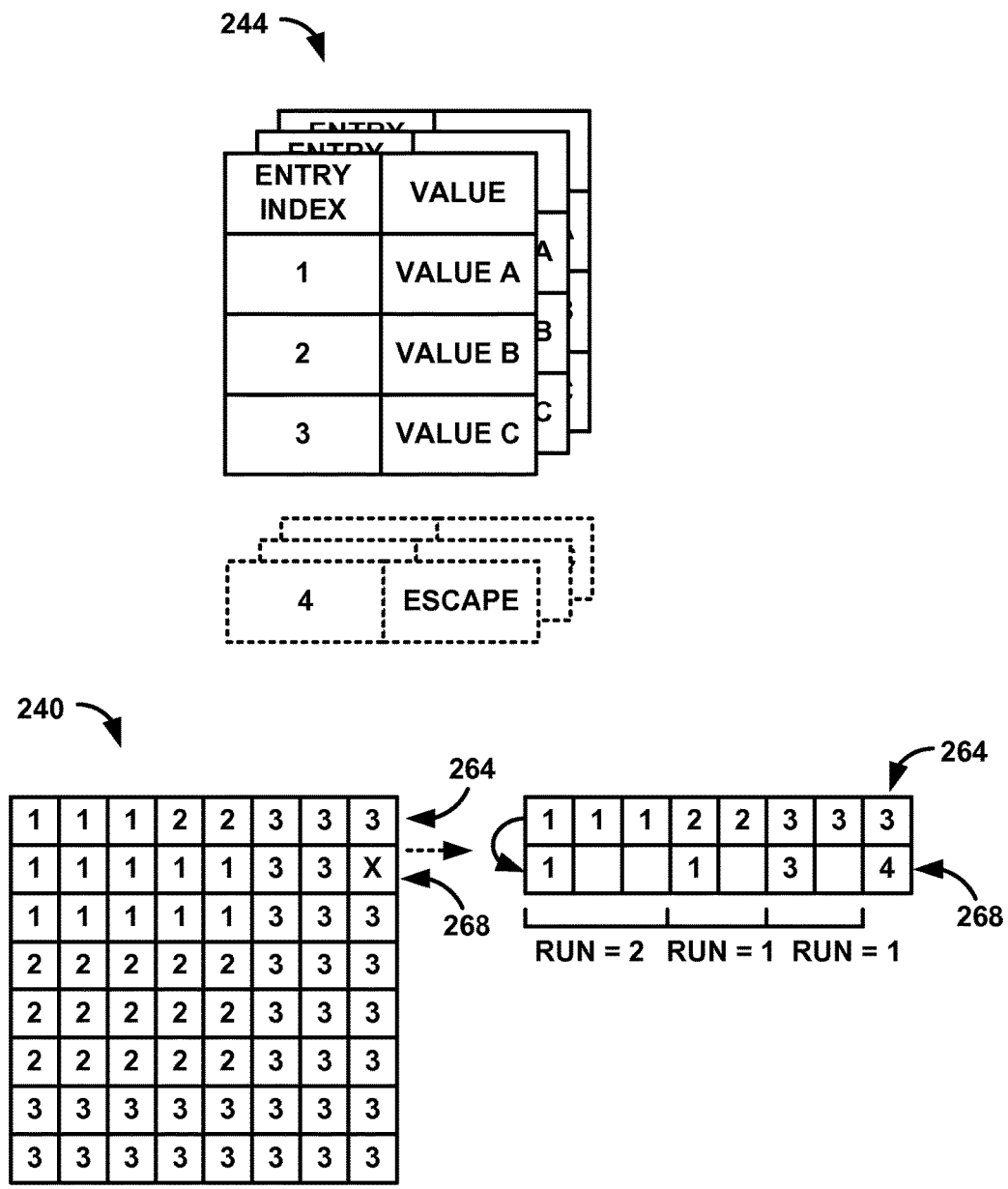
FIG. 5 is a conceptual diagram illustrating an example of determining indices to a palette for a block of pixels, consistent with techniques of this disclosure.

FIG. 5 is a conceptual diagram illustrating an example of determining indices to a palette for a block of pixels, consistent with techniques of this disclosure. For example, FIG. 5 includes a map 240 of index values (values 1, 2, and 3) that relate respective positions of pixels associated with the index values to an entry of palettes 244.

For example, index 1 is associated with Value A, index 2 is associated with Value B, and index 3 is associated with Value C. In addition, when escape samples are indicated using implicit escape signaling, video encoder 20 and video decoder 30 may also add an additional index to palettes 244, illustrated in FIG. 5 as index 4, which may indicate that samples of map 240 associated with index 4 are escape samples.

While map 240 is illustrated in the example of FIG. 5 as including an index value for each pixel position, it should be understood that in other examples, not all pixel positions may be associated with an index value relating the pixel value to an entry of palettes 244. That is, as noted above, in some examples, video encoder 20 may encode (and video decoder 30 may obtain, from an encoded bitstream) an indication of an actual pixel value (or its quantized version) for a position in map 240 if the pixel value is not included in palettes 244.

In some examples, video encoder 20 and video decoder 30 may be configured to code an additional map indicating which pixel positions are associated with index values. For example, assume that the (i, j) entry in the map corresponds to the (i, j) position of a CU. Video encoder 20 may encode one or more syntax elements for each entry of the map (i.e., each pixel position) indicating whether the entry has an associated index value. For example, video encoder 20 may encode a flag having a value of 1 to indicate that the pixel value at the (i, j) location in the CU is one of the values in palettes 244.

Video encoder 20 may, in such an example, also encode a palette index (shown in the example of FIG. 5 as values 1-3) to indicate that pixel value in the palette and to allow video decoder to reconstruct the pixel value. In instances in which palettes 244 include a single entry and associated pixel value, video encoder 20 may skip the signaling of the index value. Video encoder 20 may encode the flag to have a value of zero to indicate that the pixel value at the (i, j) location in the CU is not one of the values in palettes 244. In this example, video encoder 20 may also encode an indication of the pixel value for use by video decoder 30 in reconstructing the pixel value. In some instances, the pixel value may be coded in a lossy manner.

The value of a pixel in one position of a CU may provide an indication of values of one or more other pixels in other positions of the CU. For example, there may be a relatively high probability that neighboring pixel positions of a CU has the same pixel value or may be mapped to the same index value (in the case of lossy coding, in which more than one pixel value may be mapped to a single index value).

Accordingly, video encoder 20 may encode one or more syntax elements indicating a number of one pixel or two or more consecutive pixels or index values in a given scan order that have the same pixel value or index value. As noted above, the string of pixels having the same palette sample mode (e.g., escape mode, Copy Above, Index Copy) may be referred to herein as a run. In an example for purposes of illustration, if two consecutive pixels in a given scan order have different index values, the run is equal to zero. If two consecutive pixels in a given scan order have the same index value but the third pixel in the scan order has a different index value, a run of type Index Copy is equal to one. For three consecutive pixels with the same index value, the run is two, and so forth. Video decoder 30 may obtain the syntax elements indicating a run from an encoded bitstream and use the data to determine the number of consecutive locations that have the same palette sample mode.

As noted above, runs may be used in conjunction with a CopyFromTop (i.e., COPY_ABOVE) or Value (i.e., INDEX_COPY) mode. In an example for purposes of illustration, consider rows 264 and 268 of map 240. Assuming a horizontal, left to right scan direction, row 264 includes three index values of "1," two index values of "2," and three index values of "3." Row 268 includes five index values of "1," two index values of "3," and one sample that is not included in palettes 244 (represented by index 4, although a sample-level escape flag may be used for explicit escape signaling), which may be referred to as an escape sample. In this example, video encoder 20 may identify particular entries of row 264 followed by a run when encoding data for row 268 (e.g., CopyFromTop mode). For example, video encoder 20 may encode one or more syntax elements indicating that the first position of row 268 (the left most position of row 268) is the same as the first position of row 264. Video encoder 20 may also encode one or more syntax elements indicating that the next run of two consecutive entries in the scan direction in row 268 are the same as the first position of row 264.

In this example, video encoder 20 may use CopyFrom-Above mode to encode data for row 268. For example, video encoder 20 may encode one or more syntax elements indicating that the first position of row 268 (the left most position of row 268) is the same as the first position of row 264. Video encoder 20 may also encode one or more syntax elements indicating that the next run of two consecutive entries in the scan direction in row 268 are the same as the first position of row 264.

After encoding the one or more syntax elements indicating the first position of row 264 and the run of two entries (noted above), video encoder 20 may encode, for the fourth and fifth positions in line 268 (from left to right), one or more syntax elements indicating a value of 1 for the fourth position and one or more syntax elements indicating a run of 1 (e.g., Value mode). Hence, video encoder 20 encodes these two positions without reference to another line.

Video encoder 20 may then encode the first position having an index value of 3 in row 268 using CopyFromTop mode relative to upper row 264. For example, video encoder 20 may signal a CopyFromTop mode and a run of 1. Accordingly, video encoder 20 may select between coding pixel or index values of a line relative to other values of the line, e.g., using a run, coding pixel or index values of a line relative to values of another line (or column), or a combination thereof. Video encoder 20 may, in some examples, perform a rate/distortion optimization to make the selection.

Video encoder 20 may then encode the escape sample for the final sample of row 268 (from left to right), which is not included in first palettes 244. For example, video encoder 20 may encode the final position of row 268 as an escape sample. That is, video encoder 20 may encode an indication that the final position of row 268 is an escape sample (e.g., index 4), as well as an indication of the sample value. Video decoder 30 may obtain the above-described syntax from an encoded bitstream and reconstruct row 268 using such syntax.

Video decoder 30 may receive the syntax elements described above and reconstruct row 268. For example, video decoder 30 may obtain data indicating a particular location in a neighboring row from which to copy the associated index value for the position of map 240 currently being coded. Video decoder 30 may also obtain data indicating the number of consecutive positions (e.g., one position or two or more consecutive positions) in the scan order having the same index value. While described with respect to a horizontal scan order, the techniques of this disclosure may also be applied to another scan direction, such as a vertical or diagonal (e.g., 45 degrees or 135 degrees diagonally in block) scan direction.

In accordance with a technique of this disclosure, in the example of FIG. 5, video encoder 20 may signal a run length skip syntax element indicating whether signaling of a length of a first run or a last run of map 240 is skipped.

FIG. 6A is a flowchart illustrating an example operation of video encoder 20, in accordance with a technique of this disclosure. The flowcharts of this disclosure are provided as examples. Other example operations in accordance with the techniques of this disclosure may include more, fewer, or different actions. Furthermore, other example operations in accordance with the techniques of this disclosure may include the actions in different orders or in parallel.

In the example of FIG. 6A, video encoder 20 determines palette indices of non-escape coded pixels of a block of the video data (300). For each respective non-escape coded pixel of the block, the palette index of the respective non-escape coded pixel indicates an entry in a palette. Each entry in the palette indicates a set of one or more sample values. A non-escape coded pixel is a pixel encoded using a palette sample mode other than the escape mode (e.g., Copy Above mode or Index Copy mode).

Furthermore, in the example of FIG. 6A, video encoder 20 identifies a series of runs in the block (302). The series of runs may include two or more runs. Each respective run of the series of runs may consist of one pixel or two or more consecutive pixels of the block. Each pixel of each respective run of the series of runs may have the same palette sample mode (e.g., escape mode, Copy Above mode, Index Copy mode).

Additionally, in the example of FIG. 6A, video encoder 20 generates a set of one or more palette run length syntax elements (304). The one or more palette run length syntax elements indicate lengths of one or more runs in the series of runs. Furthermore, in the example of FIG. 6A, video encoder 20 generates a syntax element having a particular value indicating the set of palette run length syntax elements does not indicate a length of the first run of the series of runs (306).

FIG. 6B is a flowchart illustrating an example operation of video decoder 30, in accordance with a technique of this disclosure. In the example of FIG. 6B, video decoder 30 obtains a syntax element from a bitstream that comprises an encoded representation of a block of the video data (350). The block comprises a series of runs. The series of runs may include two or more runs. Each respective run of the series of runs may consist of one pixel or two or more consecutive pixels of the block. Furthermore, each pixel of each respective run of the series of runs has the same palette sample mode (e.g., escape mode, Copy Above mode, Index Copy mode). Additionally, in the example of FIG. 6B, video decoder 30 obtains, from the bitstream, a set of one or more palette run length syntax elements (352). The one or more palette run length syntax elements indicate lengths of one or more runs in the series of runs.

Furthermore, in the example of FIG. 6B, video decoder 30 determines, based on the syntax element having a particular value, that the set of palette run length syntax elements does not indicate a length of the first run of the series of runs (354). Furthermore, in the example of FIG. 6B, video decoder 30 determines, based on the number of pixels in the block and the lengths indicated by the set of palette run syntax elements, the length of the first run of the series of runs (356).

Additionally, in the example of FIG. 6B, video decoder 30 determines, based on the palette sample modes of the pixels of the block, palette indices of non-escape coded pixels of the block (358). For each respective non-escape coded pixel of the block, the respective palette index of the respective non-escape coded pixel indicates an entry in a palette. Each respective entry in the palette indicates a respective set of one or more sample values. In the example of FIG. 6B, video decoder 30 determines, based on the palette indices of the non-escape coded pixels of the block, values of the non-escape coded pixels of the block (360).

The following are paragraphs list some examples of this disclosure.

Example 1

A method of processing video data, the method comprising: coding a block of video data using a palette of color values and one or more palette run length syntax elements, the palette run length syntax elements indicating a run length of a number of pixels in the block that use the same palette index; and coding a first syntax element indicating whether a particular one of the one or more palette run length syntax elements is not signaled.

Example 2

The method of example 1, wherein the particular one of the one or more palette run length syntax elements is a first palette run length syntax element in the block of video data.

Example 3

The method of example 2, wherein the first syntax element indicates the first palette run length syntax element is not signaled, the method further comprising: inferring the run length for the first palette run length syntax element to be a temporary run length of zero; and replacing the temporary run-length of zero by calculating an actual run length based on subsequently received palette run length syntax elements for the block of video data.

Example 4

The method of example 2, wherein the first syntax element indicates the first palette run length syntax element is not signaled, and wherein coding the block of video data further comprises coding the block of video data according to a palette run type, the method further comprising: coding a second syntax element indicating the palette run type for a first line of the block of video data in the case that a currently coded pixel in the first line of the block of video data is not a first pixel in a scanning order; and inferring a value of the second syntax element indicating the palette run type to be a COPY_ABOVE run type in the case that the currently coded pixel in the first line of the block of video data is the first pixel in the scanning order.

Example 5

The method of example 2, wherein the first syntax element indicates the first palette run length syntax element is not signaled, and wherein coding the block of video data further comprises coding the block of video data according to a palette run type, the method further comprising: coding a second syntax element indicating the palette run type for a first line of the block of video data in the case that a currently coded pixel in the first line of the block of video data is a first pixel in in the block and a previous palette run type is not a COPY_ABOVE run type; and inferring a value of the second syntax element indicating the palette run type to be a INDEX_COPY run type in the case that the currently coded pixel in the first line of the block of video data is not first pixel in in the block and the previous palette run type is the COPY_ABOVE run type.

Example 6

The method of example 1, wherein a COPY_ABOVE run length is defined as having a length of greater than zero.

Example 7

The method of example 6, further comprising: coding a third syntax element indicating whether or not all COPY_ABOVE run lengths for the block of video data are greater than zero.

Example 8

The method of example 7, further comprising: in the case that the third syntax element indicates that all COPY_ABOVE run lengths for the block of video data are greater than zero, coding a combination of the COPY_ABOVE run type and a run length of zero to indicate a INDEX_COPY run length.

Example 9

The method of example 1, wherein the particular one of the one or more palette run length syntax elements is a last palette run length syntax element in the block of video data.

Example 10

The method of example 1, further comprising: inferring a value of the first syntax element in the case that the palette of color values has a size of one and coding the block of video data involves the use of no escape pixels; and inferring the run length for the entire block of video data.

Example 11

The method of example 1, further comprising: inferring a value of the first syntax element in the case that the palette of color values has a size of zero; and inferring the run length for the entire block of video data.

Example 12

The method of example 1, further comprising: coding the first syntax element using context adaptive binary arithmetic coding (CABAC).

Example 13

A video encoder configured to perform any combination of techniques of examples 1-12.

Example 14

A video decoder configured to perform any combination of techniques of examples 1-12.

Example 15

An apparatus comprising means for performing any combination of techniques of examples 1-12.

Example 16

A method comprising any combination of techniques of examples 1-12.

Example 17

A computer-readable storage medium storing instructions that, when executed, cause one or more processors to perform any combination of techniques of examples 1-12.

It should be understood that all of the techniques described herein may be used individually or in combination. It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

obtaining a first syntax element from a bitstream that comprises an encoded representation of a first block of the video data, wherein the first block comprises a first series of runs, the first series of runs including two or more runs, each respective run of the first series of runs consisting of one pixel or two or more consecutive pixels of the first block, each pixel of each respective run of the first series of runs having a same palette sample mode;

obtaining, from the bitstream, a first set of one or more palette run length syntax elements, wherein the first set of one or more palette run length syntax elements indicate lengths of one or more runs in the first series of runs;

determining, based on the first syntax element having a first value, that the first set of palette run length syntax elements does not indicate a length of the first run of the first series of runs;

determining, based on the number of pixels in the first block and the lengths indicated by the first set of palette run syntax elements, the length of the first run of the series of runs;

determining, based on palette sample modes of the pixels of the first block, palette indices of non-escape coded pixels of the first block, wherein, for each respective non-escape coded pixel of the first block, the respective palette index of the respective non-escape coded pixel indicates an entry in a first palette, each respective entry in the first palette indicating a respective set of sample values;

determining, based on the palette indices of the non-escape coded pixels of the first block, values of the non-escape coded pixels of the first block;

obtaining, from the bitstream, a second syntax element, wherein a second block of the video data comprises a second series of runs, the second series of runs including two or more runs, each respective run of the second series of runs consisting of one pixel or two or more consecutive pixels of the second block, each pixel of each respective run of the second series of runs having a same palette sample mode;

obtaining, from the bitstream, a second set of one or more palette run length syntax elements, wherein the second set of palette run length syntax elements indicates lengths of one or more runs of the second series of runs;

determining, based on the second syntax element having a second value different from the first value, that the second set of palette run length syntax elements does not indicate a length of the last run of the second series of runs;

determining, based on the number of pixels in the second block and the lengths indicated by the second set of palette run syntax elements, the length of the last run of the second series of runs;

determining, based on palette sample modes of the pixels of the second block, palette indices of the pixels of the second block; and determining, based on the palette indices of the pixels of the second block, values of pixels of the second block.

2. The method of claim 1, further comprising:

in response to determining (1) the size of the first palette is not equal to 1 or there is an escape pixel in the first block; and (2) the size of the first palette is not 0, determining the bitstream includes the first syntax element.

3. The method of claim 1, further comprising:

responsive to determining the first set of palette run length syntax elements does not indicate the length of the first run of the first series of runs, obtaining, from the bitstream, a third syntax element unless (1) a current pixel is the first pixel of the first block in scanning order, or (2) the current pixel is not the first pixel of the first block and a previous run has a Copy Above run type, wherein:

the current pixel is the first line of the first block and is the first pixel of a particular run, when the current pixel is not the first pixel of the first block and the previous run exists, the particular run follows the previous run and there is no other run between the particular run and the previous run, the third syntax element indicates a run type of the particular run is one of: the Copy Above run type or an Index Copy run type, for each respective pixel of a run having the Copy Above run type, a palette index of the respective pixel is the same as a palette index of a pixel immediately above the respective pixel, and for each respective pixel of a run having the Index Copy run type, a palette index of the respective pixel is the same as a palette index of a pixel immediately left of the respective pixel.

4. The method of claim 1, the method further comprising:

obtaining, from the bitstream, a third syntax element, wherein a third block comprises a third series of runs, the third series of runs including two or more runs, each respective run of the third series of runs consisting of one pixel or two or more consecutive pixels of the third block, each pixel of each respective run of the third series of runs having a same palette sample mode;

obtaining, from the bitstream, a third set of one or more palette run length syntax elements, wherein the third set of palette run length syntax elements indicates lengths of one or more runs of the third series of runs;

determining, based on the third syntax element having the first value, that the third set of palette run length syntax elements does not indicate a length of the first run of the third series of runs;

determining, based on the number of pixels in the third block and the lengths indicated by the third set of palette run syntax elements, the length of the first run of the third series of runs;

responsive to determining the third set of palette run length syntax elements does not indicate the length of the first run of the third series of runs and determining a current pixel is the first pixel of the third block in scanning order, inferring the first run of the third series of runs has a Copy Above run type, wherein the current pixel is the first line of the third block and is the first pixel of the first run of the third series of runs, wherein, for each respective pixel of a run having the Copy Above run type, a palette index of the respective pixel is the same as a palette index of a pixel immediately above the respective pixel;

determining, based on palette sample modes of the pixels of the third block, palette indices of the pixels of the third block; and determining, based on the palette indices of the pixels of the third block, values of pixels of the third block.

5. The method of claim 1, further comprising:

obtaining, from the bitstream, a third syntax element, wherein a third block comprises a third series of runs, the third series of runs including two or more runs, each respective run of the third series of runs consisting of one pixel or two or more consecutive pixels of the third block, each pixel of each respective run of the third series of runs having the same palette sample mode;

obtaining, from the bitstream, a third set of one or more palette run length syntax elements, wherein the third set of palette run length syntax elements indicates lengths of one or more runs of the third series of runs;

determining, based on the third syntax element having the first value, that the third set of palette run length syntax elements does not indicate a length of the first run of the third series of runs;

determining, based on the number of pixels in the third block and the lengths indicated by the third set of palette run syntax elements, the length of the first run of the third series of runs;

responsive to determining the third set of palette run length syntax elements does not indicate the length of the first run of the third series of runs and determining a current pixel is not the first pixel of the third block in scanning order and a run type of a previous run is a Copy Above run type, inferring a particular run of the third series of runs has an Index Copy run type, wherein:

the current pixel is in the first line of the block and is the first pixel of the particular run, the particular run follows the previous run and there is no other run between the particular run and the previous run, for each respective pixel of a run having the Copy Above run type, a palette index of the respective pixel is the same as a palette index of a pixel immediately above the respective pixel, and for each respective pixel of a run having the Index Copy run type, a palette index of the respective pixel is the same as a palette index of a pixel immediately left of the respective pixel;

determining, based on palette sample modes of the pixels of the third block, palette indices of the pixels of the third block; and determining, based on the palette indices of the pixels of the third block, values of pixels of the third block.

6. The method of claim 1, further comprising:

obtaining, from the bitstream, a set of one or more run type syntax elements, each respective run type syntax element of the set of run type syntax elements indicating a run type of a respective run in the first series of runs; and responsive to determining the first set of palette run length syntax elements does not indicate the length of the first run of the first series of runs and responsive to determining that the length of the first run of the first series of runs is equal to 0 and/or the length of the last run of the first series of runs is equal to 0, determining that the set of run type syntax elements does not include a run type syntax element indicating a run type of the last run in the first series of runs.

7. The method of claim 1, further comprising:
obtaining a third syntax element from the bitstream, the third syntax element indicating whether all runs of the first series of runs having a Copy Above run type have lengths greater than 0,
   wherein, for each respective pixel of a run having the Copy Above run type, a palette index of the respective pixel is the same as a palette index of a pixel immediately above the respective pixel; and
responsive to determining the third syntax element indicates all runs of the first series of runs having the Copy Above run type have lengths greater than 0, determining, for each respective run of the first series of runs having the Copy Above run type, a respective palette run length syntax element of the first set of palette run length syntax element is 1 less than an actual length of the respective run.

8. The method of claim 1, wherein:
a third block comprises a third series of runs, the third series of runs including two or more runs, each respective run of the third series of runs consisting of one pixel or two or more consecutive pixels of the third block, each pixel of each respective run of the third series of runs having a same palette sample mode,
the method further comprises: obtaining, from the bitstream, a third set of one or more palette run length syntax elements, wherein the third set of palette run length syntax elements indicates lengths of one or more runs of the third series of runs,
one of the following applies:
the bitstream is subject to a requirement that each run of the third series of runs having a Copy Above run type has a length greater than 0, and
the bitstream includes a third syntax element indicating all runs of the third series of runs having the Copy Above run type have lengths greater than 0,
for each respective pixel of a run having the Copy Above run type, a palette index of the respective pixel is the same as a palette index of a pixel immediately above the respective pixel,
the method further comprises:
in response to obtaining, from the bitstream, a run type syntax element indicating a particular run of the third series of runs has the Copy Above run type and a palette run length syntax element of the third set of palette run length syntax elements indicating a length of the particular run is 0, determining the particular run actually has an Index Copy run type and the length of the particular run actually is equal to a total number of pixels in the third block minus the lengths of each other run of the third series of runs minus the number of runs in the third series of runs, and
for each respective pixel of a run having the Index Copy run type, a palette index of the respective pixel is the same as a palette index of a pixel immediately left of the respective pixel.

9. The method of claim 1, further comprising:
selecting a context from a plurality of contexts, wherein the selection is based on at least one of: a block size of the first block, a palette size, whether an escape pixel is present in the first block, or a number of signaled palette indices in the first block; and
using the selected context in Context Adaptive Binary Arithmetic Coding (CABAC) to decode the first syntax element.

10. A method of encoding video data, the method comprising:
determining palette indices of non-escape coded pixels of a first block of the video data, wherein, for each respective non-escape coded pixel of the first block, the palette index of the respective non-escape coded pixel indicates an entry in a first palette, wherein each respective entry in the first palette indicates a respective set of sample values;
identifying a first series of runs in the first block, the first series of runs including two or more runs, each respective run of the first series of runs consisting of one pixel or two or more consecutive pixels of the first block, each pixel of each respective run of the first series of runs having a same palette sample mode;
generating a first set of one or more palette run length syntax elements, wherein the first set of one or more palette run length syntax elements indicate lengths of one or more runs in the first series of runs;
generating a first syntax element having a first value indicating the first set of palette run length syntax elements does not indicate a length of the first run of the first series of runs;
determining palette indices of pixels of a second block of the video data, wherein, for each respective pixel of the second block, the palette index of the respective pixel indicates an entry in a second palette, wherein each respective entry in the second palette indicates a respective set of sample values;
identifying a second series of runs, each respective run of the second series of runs consisting of one pixel or two or more consecutive pixels of the second block, each pixel of each respective run of the second series of runs having a same palette sample mode;
generating a second set of one or more palette run length syntax elements, wherein the second set of palette run length syntax elements indicates lengths of one or more runs of the second series of runs; and
generating a second syntax element, the second syntax element having a second value indicating the second set of palette run length syntax elements does not indicate a length of the last run of the second series of runs, the second value being different from the first value.

11. The method of claim 10, wherein generating the first syntax element comprises: in response to determining (1) the size of the first palette is not equal to 1 or there is an escape pixel in the first block; and (2) the size of the first palette is not 0, generating the first syntax element.

12. The method of claim 10, further comprising:
generating a third syntax element unless (1) a current pixel is the first pixel of the first block in scanning order, or (2) the current pixel is not the first pixel of the first block and a previous run has a Copy Above run type, wherein:
   the current pixel is the first line of the first block and is the first pixel of a particular run,
   when the current pixel is not the first pixel of the first block and the previous run exists, the particular run follows the previous run and there is no other run between the particular run and the previous run,
   the third syntax element indicates a run type of the particular run as being one of: Copy Above or Index Copy, for each respective pixel of a run having the Copy Above run type, a palette index of the respective pixel is the same as a palette index of a pixel immediately above the respective pixel, and for each respective pixel of a run having the Index Copy run type, a palette index of the respective pixel is the same as a palette index of a pixel immediately left of the respective pixel.

13. The method of claim 10, further comprising:

generating a set of one or more run type syntax elements, each respective run type syntax element of the set of run type syntax elements indicating a run type of a respective run in the first series of runs, wherein when the first set of palette run length syntax elements does not indicate the length of the first run of the first series of runs and responsive to determining that the length of the first run of the first series of runs is equal to 0 and/or the length of the last run of the first series of runs is equal to 0, the set of run type syntax elements does not include a run type syntax element indicating a run type of the last run in the first series of runs.

14. The method of claim 10, further comprising:

generating a third syntax element, the third syntax element indicating whether all runs of the first series of runs having a Copy Above run type have lengths greater than 0, wherein:

for each respective pixel of a run having the Copy Above run type, a palette index of the respective pixel is the same as a palette index of a pixel immediately above the respective pixel; and when the third syntax element indicates all runs of the first series of runs having the Copy Above run type have lengths greater than 0, for each respective run of the first series of runs having the Copy Above run type, a respective palette run length syntax element of the first set of palette run length syntax elements is 1 less than an actual length of the respective run.

15. The method of claim 10, further comprising:

selecting a context from a plurality of contexts, wherein the selection is based on at least one of: a block size of the first block, a palette size, whether an escape pixel is present in the first block, and a number of signaled palette indices in the first block; and using the selected context in Context Adaptive Binary Arithmetic Coding (CABAC) to encode the first syntax element.

16. A device for decoding video data, the device comprising:

a memory configured to store the video data; and one or more processors configured to:

obtain a first syntax element from a bitstream that comprises an encoded representation of a first block of the video data, wherein the first block comprises a first series of runs, the first series of runs including two or more runs, each respective run of the first series of runs consisting of one pixel or two or more consecutive pixels of the first block, each pixel of each respective run of the first series of runs having a same palette sample mode;

obtain, from the bitstream, a first set of one or more palette run length syntax elements, wherein the first set of one or more palette run length syntax elements indicate lengths of one or more runs in the first series of runs;

determine, based on the first syntax element having a first value, that the first set of palette run length syntax elements does not indicate a length of the first run of the first series of runs;

determine, based on the number of pixels in the first block and the lengths indicated by the first set of palette run syntax elements, the length of the first run of the first series of runs;

determine, based on palette sample modes of non-escape coded pixels of the first block, palette indices of the non-escape coded pixels of the first block, wherein, for each respective non-escape coded pixel of the first block, the respective palette index of the respective non-escape coded pixel indicates an entry in a first palette, each respective entry in the first palette indicating a respective set of sample values;

determine, based on the palette indices of the non-escape coded pixels of the first block, values of the non-escape coded pixels of the first block;

obtain, from the bitstream, a second syntax element, wherein a second block of the video data comprises a second series of runs, the second series of runs including two or more runs, each respective run of the second series of runs consisting of one pixel or two or more consecutive pixels of the second block, each pixel of each respective run of the second series of runs having a same palette sample mode;

obtain, from the bitstream, a second set of one or more palette run length syntax elements, wherein the second set of palette run length syntax elements indicates lengths of one or more runs of the second series of runs;

determine, based on the second syntax element having a second value different from the first value, that the second set of palette run length syntax elements does not indicate a length of the last run of the second series of runs;

determine, based on the number of pixels in the second block and the lengths indicated by the second set of palette run syntax elements, the length of the last run of the second series of runs;

determine, based on palette sample modes of the pixels of the second block, palette indices of the pixels of the second block; and determine, based on the palette indices of the pixels of the second block, values of pixels of the second block.

17. The device of claim 16, wherein the one or more processors are configured such that, in response to determining (1) the size of the first palette is not equal to 1 or there is an escape pixel in the first block; and (2) the size of the first palette is not 0, the one or more processors determine the bitstream includes the first syntax element.

18. The device of claim 16, wherein the one or more processors are configured such that, responsive to determining the first set of palette run length syntax elements does not indicate the length of the first run of the first series of runs, the one or more processors:

obtain, from the bitstream, a third syntax element unless (1) a current pixel is the first pixel of the first block in scanning order, or (2) the current pixel is not the first pixel of the first block and a previous run has a Copy Above run type, wherein:

the current pixel is the first line of the first block and is the first pixel of a particular run, when the current pixel is not the first pixel of the first block and the previous run exists, the particular run follows the previous run and there is no other run between the particular run and the previous run, the third syntax element indicates a run type of the particular run is one of: the Copy Above run type or an Index Copy run type, for each respective pixel of a run having the Copy Above run type, a palette index of the respective pixel is the same as a palette index of a pixel immediately above the respective pixel, and for each respective pixel of a run having the Index Copy run type, a palette index of the respective pixel is the same as a palette index of a pixel immediately left of the respective pixel.

19. The device of claim 16, wherein the one or more processors are further configured to:

obtain a third syntax element from the bitstream, the third syntax element indicating whether all runs of the first series of runs having a Copy Above run type have lengths greater than 0, wherein, for each respective pixel of a run having the Copy Above run type, a palette index of the respective pixel is the same as a palette index of a pixel immediately above the respective pixel; and responsive to determining the third syntax element indicates all runs of the first series of runs having the Copy Above run type have lengths greater than 0, determine, for each respective run of the first series of runs having the Copy Above run type, a respective palette run length syntax element of the first set of palette run length syntax element is 1 less than an actual length of the respective run.

20. The device of claim 16, wherein the one or more processors are configured to:

select a context from a plurality of contexts, wherein the selection is based on at least one of: a block size of the first block, a palette size, whether an escape pixel is present in the first block, and a number of signaled palette indices in the first block; and use the selected context in Context Adaptive Binary Arithmetic Coding (CABAC) to decode the first syntax element.

21. A device for encoding video data, the device comprising:

a memory configured to store the video data; and one or more processors configured to:

determine palette indices of non-escape coded pixels of a first block of the video data, wherein, for each respective non-escape coded pixel of the first block, the palette index of the respective pixel indicates an entry in a first palette, wherein each respective entry in the first palette indicates a respective set of sample values;

identify a first series of runs in the first block, the first series of runs including two or more runs, each respective run of the first series of runs consisting of one pixel or two or more consecutive pixels of the first block, each pixel of each respective run of the first series of runs having a same palette sample mode;

generate a first set of one or more palette run length syntax elements, wherein the first set of one or more palette run length syntax elements indicate lengths of one or more runs in the first series of runs;

generate a first syntax element having a first value indicating the first set of palette run length syntax elements does not indicate a length of the first run of the first series of runs;

determine palette indices of pixels of a second block of the video data, wherein, for each respective pixel of the second block, the palette index of the respective pixel indicates an entry in a second palette, wherein each respective entry in the second palette indicates a respective set of sample values;

identify a second series of runs, each respective run of the second series of runs consisting of one pixel or two or more consecutive pixels of the second block, each pixel of each respective run of the second series of runs having a same palette sample mode;

generate a second set of one or more palette run length syntax elements, wherein the second set of palette run length syntax elements indicates lengths of one or more runs of the second series of runs; and generate a second syntax element, the second syntax element having a second value indicating the second set of palette run length syntax elements does not indicate a length of the last run of the second series of runs, the second value being different from the first value.

22. The device of claim 21, wherein the one or more processors are configured to generate the first syntax element in response to determining (1) the size of the first palette is not equal to 1 or there is an escape pixel in the first block; and (2) the size of the first palette is not 0.

23. The device of claim 21, wherein the one or more processors are configured to:

generate a third syntax element unless (1) a current pixel is the first pixel of the first block in scanning order, or (2) the current pixel is not the first pixel of the first block and a previous run has a Copy Above run type, wherein:

the current pixel is the first line of the first block and is the first pixel of a particular run, when the current pixel is not the first pixel of the first block and the previous run exists, the particular run follows the previous run and there is no other run between the particular run and the previous run, the third syntax element indicates a palette sample mode for the first line of the first block, the palette sample mode being one of: Copy Above or Index Copy, for each respective pixel of a run having the Copy Above run type, a palette index of the respective pixel is the same as a palette index of a pixel immediately above the respective pixel, and for each respective pixel of a run having the Index Copy run type, a palette index of the respective pixel is the same as a palette index of a pixel immediately left of the respective pixel.

24. The device of claim 21, wherein the syntax element is a first syntax element, the one or more processors configured to:

generate a third syntax element, the third syntax element indicating whether all runs of the first series of runs having a Copy Above run type have lengths greater than 0, wherein:

for each respective pixel of a run having the Copy Above run type, a palette index of the respective pixel is the same as a palette index of a pixel immediately above the respective pixel; and when the third syntax element indicates all runs of the first series of runs having the Copy Above run type have lengths greater than 0, for each respective run of the first series of runs having the Copy Above run type, a respective palette run length syntax element of the first set of palette run length syntax elements is 1 less than an actual length of the respective run.

25. The device of claim 21, wherein the one or more processors are configured to:

select a context from a plurality of contexts, wherein the selection is based on at least one of: a block size of the first block, a palette size, whether an escape pixel is present in the first block, and a number of signaled palette indices in the first block; and
use the selected context in Context Adaptive Binary Arithmetic Coding (CABAC) to encode the first syntax element.

26. The device of claim 16, wherein the device comprises at least one of:
an integrated circuit;
a microprocessor; or
a wireless communication device.

27. The device of claim 26, further comprising a display configured to display decoded video data.

28. The device of claim 21, wherein the device comprises at least one of:
an integrated circuit;
a microprocessor; or
a wireless communication device.

29. The device of claim 28, further comprising a camera configured to capture the video data.

\* \* \* \* \*